United States Patent
Rannells, Jr. et al.

(10) Patent No.: US 6,264,337 B1
(45) Date of Patent: *Jul. 24, 2001

(54) VEHICLE SAFETY SYSTEM

(76) Inventors: Charles T. Rannells, Jr., 4309 Jeffers Dr.; Leslie A. Bomar, 109 W. Daisy Ln., both of New Albany, IN (US) 47150; Christopher K. Reifsteck, 1412 S. Brook, Louisville, KY (US) 40208; Alois A. Arnold, 1615 Bardstown Rd., Louisville, KY (US) 40205

(*) Notice: Subject to any disclaimer, the term of this patent is extended or adjusted under 35 U.S.C. 154(b) by 0 days.

This patent is subject to a terminal disclaimer.

(21) Appl. No.: 09/391,911

(22) Filed: Sep. 9, 1999

Related U.S. Application Data

(62) Division of application No. 08/373,123, filed on Jan. 13, 1995, now Pat. No. 5,980,048.

(51) Int. Cl.[7] ............... G02B 5/08; B60R 1/06; B60Q 1/00; B62D 53/06
(52) U.S. Cl. ............ 359/843; 359/872; 359/877; 180/167; 180/169; 180/271; 280/423.1; 280/426; 280/432; 340/431; 340/435; 340/436; 362/494
(58) Field of Search .................. 359/842, 872, 359/877; 180/167, 168, 169, 271; 280/407.1, 423.1, 426, 432; 362/135, 494; 340/431, 435, 436

(56) References Cited

U.S. PATENT DOCUMENTS

| | | | |
|---|---|---|---|
| 3,842,397 | * | 10/1974 | Sindle . |
| 4,679,158 | * | 7/1987 | Tate . |
| 4,779,095 | * | 10/1988 | Guerreri . |
| 5,132,851 | * | 7/1992 | Bomar et al. .............. 359/843 |
| 5,306,953 | * | 4/1994 | Weiner ..................... 359/843 |
| 5,719,713 | * | 2/1998 | Brown ..................... 359/843 |
| 5,980,048 | * | 11/1999 | Rannells, Jr. et al. ......... 359/843 |

* cited by examiner

Primary Examiner—Ricky D. Shafer
(74) Attorney, Agent, or Firm—King and Schickli, PLLC

(57) ABSTRACT

An apparatus for automatically adjusting the angle of a rotatable side view mirror of a vehicle having a trailer coupled thereto includes transducers attached to the vehicle for transmitting signals toward the trailer and for receiving signals reflected by the trailer. A control unit includes memory for storing dimensional information and a control circuit for generating a mirror control signal for controlling rotation of the rotatable side view mirror. The control circuit is operative to control at least one of the transducers to determine an angle between the vehicle and the trailer based on a time required for signals transmitted by the respective controlled at least one transducer to be reflected back to the respective at least one controlled transducer. The control circuit generates the mirror control signal based on the determined angle. The vehicle and the trailer may be angled relative to each other within a predetermined angular range including a plurality of angular range portions and the control circuit is operative to control different ones of the transducers based on the angular range portion within which the current angle falls. A drive unit supplied with the mirror control signal rotates the rotatable side view mirror.

12 Claims, 19 Drawing Sheets

FIG. 9

| SEG. PATH | MAIN MEAS. | CONF1 MEAS. | CONF2 MEAS. | PATH START | PATH STOP | START MEAS. | STOP MEAS. |
|---|---|---|---|---|---|---|---|
| 1 | E | I | 0 | 1 | 12 | 3910 | 3635 |
| 2 | C | E | G | 9 | 30 | 3920 | 3480 |
| 3 | C | 0 | 0 | 31 | 32 | 3150 | 3110 |
| 4 | A | C | 0 | 33 | 37 | 4610 | 4520 |
| 5 | A | C | F | 38 | 45 | 4500 | 4275 |
| 6 | A | F | 0 | 46 | 55 | 4250 | 3810 |
| 7 | A | F | J | 56 | 65 | 3780 | 3120 |
| 8 | D | H | J | 66 | 78 | 1800 | 2200 |
| 9 | B | D | 0 | 76 | 85 | 1830 | 2150 |
| 10 | B | 0 | 0 | 86 | 90 | 2180 | 2270 |
| 11 | E | 0 | 0 | 90 | 94 | 2270 | 2180 |
| 12 | E | C | 0 | 95 | 101 | 2150 | 1830 |
| 13 | C | I | G | 102 | 114 | 2200 | 1800 |
| 14 | F | A | G | 115 | 124 | 3120 | 3780 |
| 15 | F | A | 0 | 125 | 134 | 3810 | 4250 |
| 16 | F | D | A | 135 | 142 | 4275 | 4500 |
| 17 | F | D | 0 | 143 | 147 | 4520 | 4610 |
| 18 | D | 0 | 0 | 148 | 149 | 3110 | 3150 |
| 19 | D | B | J | 150 | 171 | 3480 | 3920 |
| 20 | B | H | 0 | 172 | 179 | 3635 | 3910 |

VEHICLE SAFETY SYSTEM

This application is a divisional of application Ser. No. 08/373,123, filed Jan. 13, 1995, now U.S. Pat. No. 5,980,048.

BACKGROUND OF THE INVENTION

1. Technical Field

The present invention generally relates to a vehicle safety system and, more particularly, to a system which provides a driver with views and/or information regarding the area around a vehicle. Prior U.S. patent application Ser. No. 08/373,123, now U.S Pat. No. 5,980,048, is hereby incorporated herein by reference.

2. Description of the Related Art

The maneuvering ability of articulated vehicles such as tractor-trailer combinations is often hampered by the difficulty in quickly and conveniently determining the location of the rear end of the trailer and in viewing the area behind the rear end of the trailer. This is particularly so when the trailer is long and the tractor is turning toward the right. Typically, externally mounted side mirrors are placed on both sides of the tractor. These mirrors are rigidly positioned for straight ahead driving. Therefore, during turns, one mirror provides a view of the side of the trailer while the other mirror provides a view of the area to the side of the trailer.

Neither of these views is useful. The much needed view of the rear of the trailer is not provided.

Although the driver can view the left rear end of the trailer and behind it by looking out the left window when the trailer is turning toward the left, the driver must turn his head and divert his attention away from the front of the vehicle. The driver's peripheral vision may not provide immediate perception of events occurring at the front of the vehicle. Moreover, the driver is unable to peer out the right window and view the right rear end of the trailer during a right turn. Stationary mirrors are also deficient when a tractor-trailer is backing into a loading or unloading area such as a dock during an attempt to park. In these situations, the tractor is almost always at an acute angle relative to the trailer to facilitate docking maneuvers. Stationary mirrors do not permit the rear of the trailer to be viewed during parking as the angle between the tractor and the trailer does not permit such a view. It is often necessary for the driver to leave the vehicle or to obtain the assistance of an additional person to perform the backing and parking maneuvers.

In view of these problems, numerous attempts have been made to provide a mirror which pivots or rotates to provide a view of the rear of a trailer during turns. Some of these prior art systems are disclosed in U.S. Pat. Nos. 2,988,957; 3,469,901; 3,527,528; 3,536,382; 3,749,480; 4,609,265; and 4,632,525. Many of these devices require complex mechanical devices with or without complicated electric circuits to rotate the side mirrors. Some devices are activated only by the turn signal of the vehicle.

One system that overcomes the above-described problems is disclosed in U.S. Pat. No. 5,132,851. Nonetheless, drivers still encounter numerous situations in which their viewing is impaired or in which it is difficult to accurately determine the position of the tractor-trailer relative to other objects. For example, drivers of tractor-trailers are frequently unable to see vehicles which are following closely or vehicles which are in other "blind spots." In addition, a truck must generally back squarely into a loading dock in order to facilitate loading and unloading operations. Even if a driver is able to see clearly the areas behind the trailer via rear view mirrors, it is still often difficult to determine whether the trailer is square with a loading dock. These problems make it more difficult to maneuver the tractor-trailer and can, in the case of unseen vehicles, lead to accidents.

SUMMARY OF THE INVENTION

According to one embodiment of the instant invention, an apparatus for automatically adjusting the angle of a rotatable side view mirror of a vehicle having a trailer coupled thereto includes transducers attached to the vehicle for transmitting signals toward the trailer and for receiving signals reflected by the trailer. A control unit includes a control circuit for generating a mirror control signal for controlling rotation of the rotatable side view mirror. The control circuit is operative to control at least one of the transducers to determine an angle between the vehicle and the trailer based on a time required for signals transmitted by the respective controlled at least one transducer to be reflected back to the respective at least one controlled transducer. The control circuit generates the mirror control signal based on the determined angle. The vehicle and the trailer may be angled relative to each other within a predetermined angular range including a plurality of angular range portions and the control circuit is operative to control different ones of the transducers based on the angular range portion within which the determined angle falls. A drive unit supplied with the mirror control signal rotates the rotatable side view mirror. Certain transducers within one or more of the angular range portions may be controlled to confirm the determined angle. This arrangement provides for a very accurate determination of the angle between the vehicle and the trailer and ensures an appropriate mirror rotation to enhance a driver's vision during turning.

In accordance with another aspect of the invention, an apparatus for automatically rotating a rotatable light source attached to a vehicle includes a circuit for determining a relative orientation of the vehicle. A control unit includes a control circuit for generating a light beam adjusting signal for adjusting the direction of the light beam of the light source. The control circuit is operative to control the circuit for determining the orientation and to generate the light beam control signal based on the determined relative orientation. A drive unit supplied with the light beam adjusting signal adjusts the light beam. This arrangement permits a light to be appropriately directed for increasing a driver's vision during turns and loading dock maneuvers.

In accordance with yet another aspect of the invention, an apparatus for automatically monitoring objects proximate to a vehicle includes a circuit for detecting objects proximate to the vehicle. A control unit including a control circuit for controlling the detecting circuit and a communicating circuit communicates to a driver of the vehicle information regarding objects detected by the detecting circuit. The communicating circuit may be either a visual communicating circuit or an aural communicating circuit. This arrangement informs a driver of any objects such as cars which may be hidden from the driver's view in blind spots such as immediately behind a trailer.

In accordance with still another aspect of the instant invention, an apparatus for assisting a driver of a vehicle in approaching a structure includes a circuit for detecting the structure and its distance. A control unit includes a control circuit for controlling the detecting circuit and a communicating circuit communicates to a driver of the vehicle information regarding an angular orientation of the vehicle relative to the structure. The communicating circuit may be either a visual communicating circuit or an aural communicating circuit. This arrangement is useful when a driver is backing into a loading dock, for example, and quickly informs the driver whether he or she is "squared up" with the loading dock.

Various additional advantages and features which characterize the invention are further pointed out in the claims that follow. However, for a better understanding of the invention and its advantages, reference should be made to the accompanying drawings and descriptive matter which illustrate and describe the instant invention.

BRIEF DESCRIPTION OF THE DRAWINGS

FIG. 9 is a table setting forth information used in the angle determination.

DETAILED DESCRIPTION

Figure 1A:
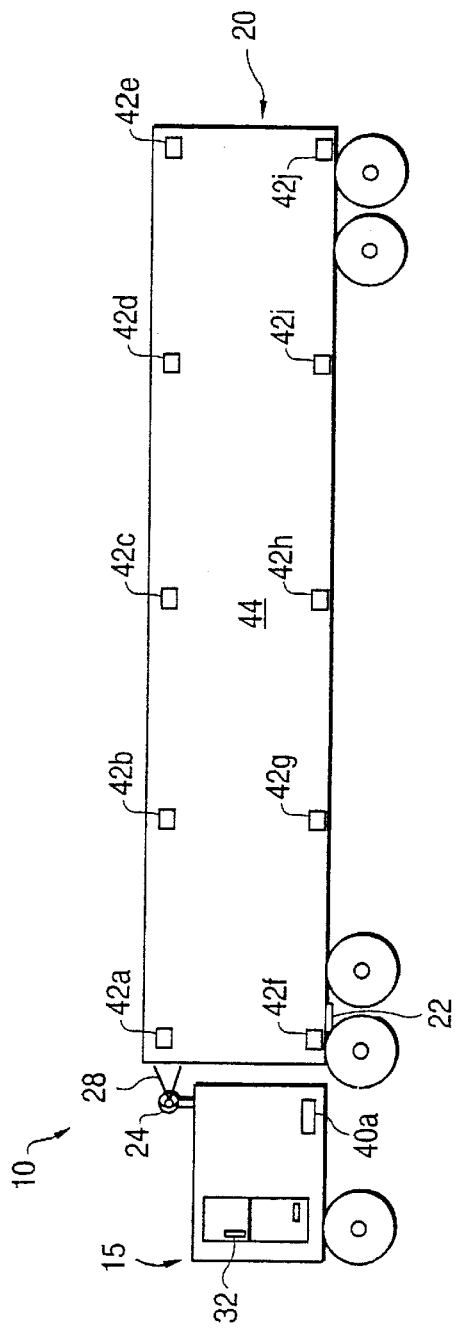
FIGS. 1A, 1B, 1C, and 1D provide various views of an articulated vehicle including a tractor 15 and a trailer 20 and which is equipped with the vehicle safety system of the instant invention.
Figure 1B:
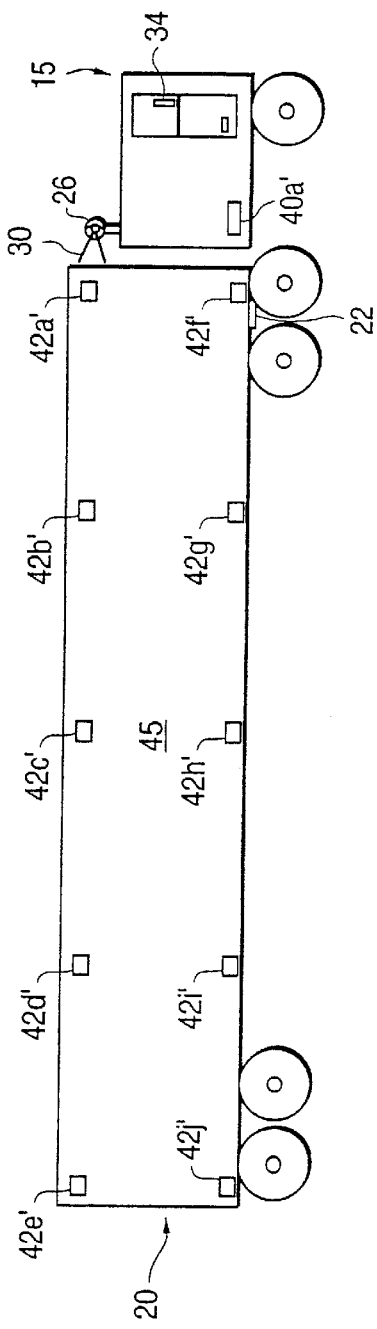
Figure 2:
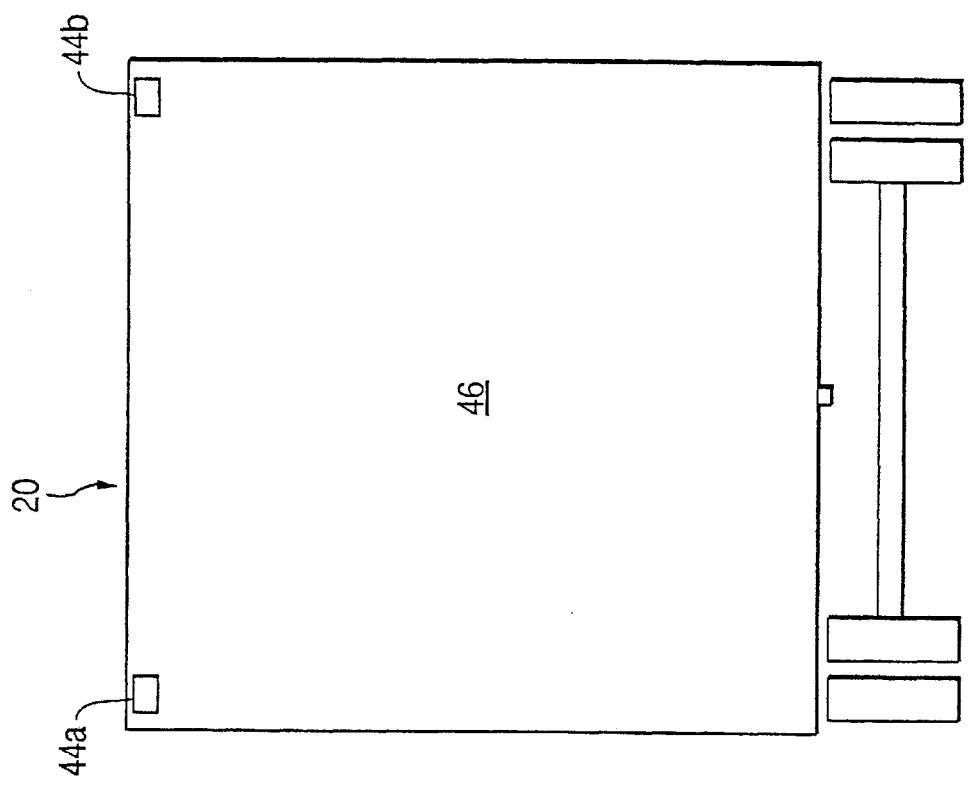
FIG. 2 is front view of trailer 20 of FIG. 1.
Figure 1C:
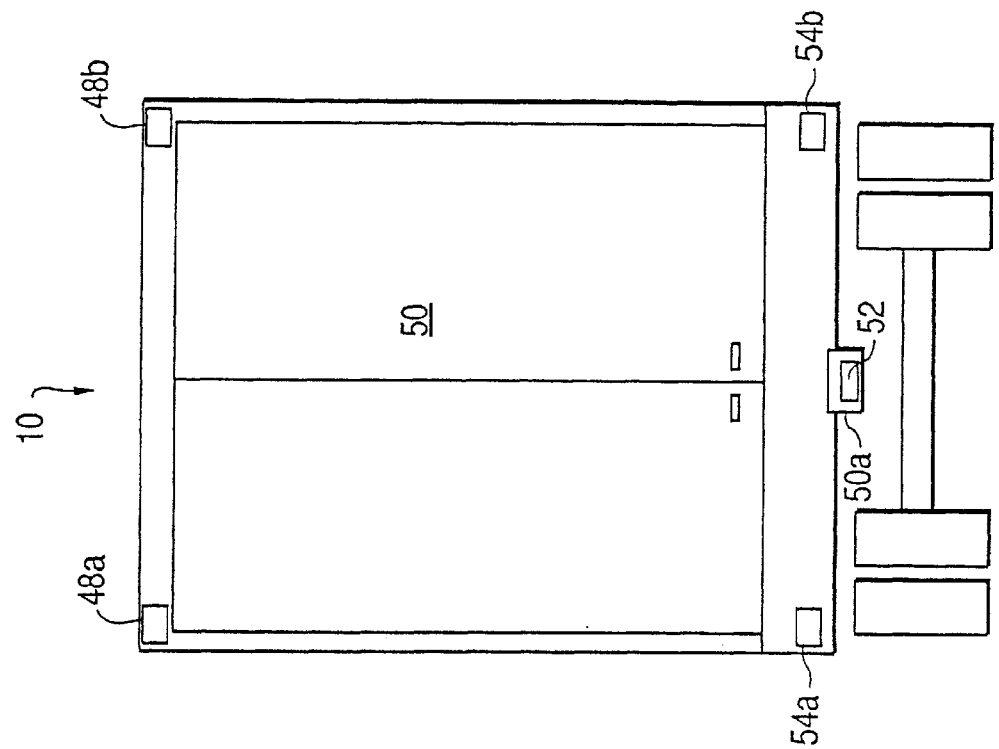
Figure 1D:
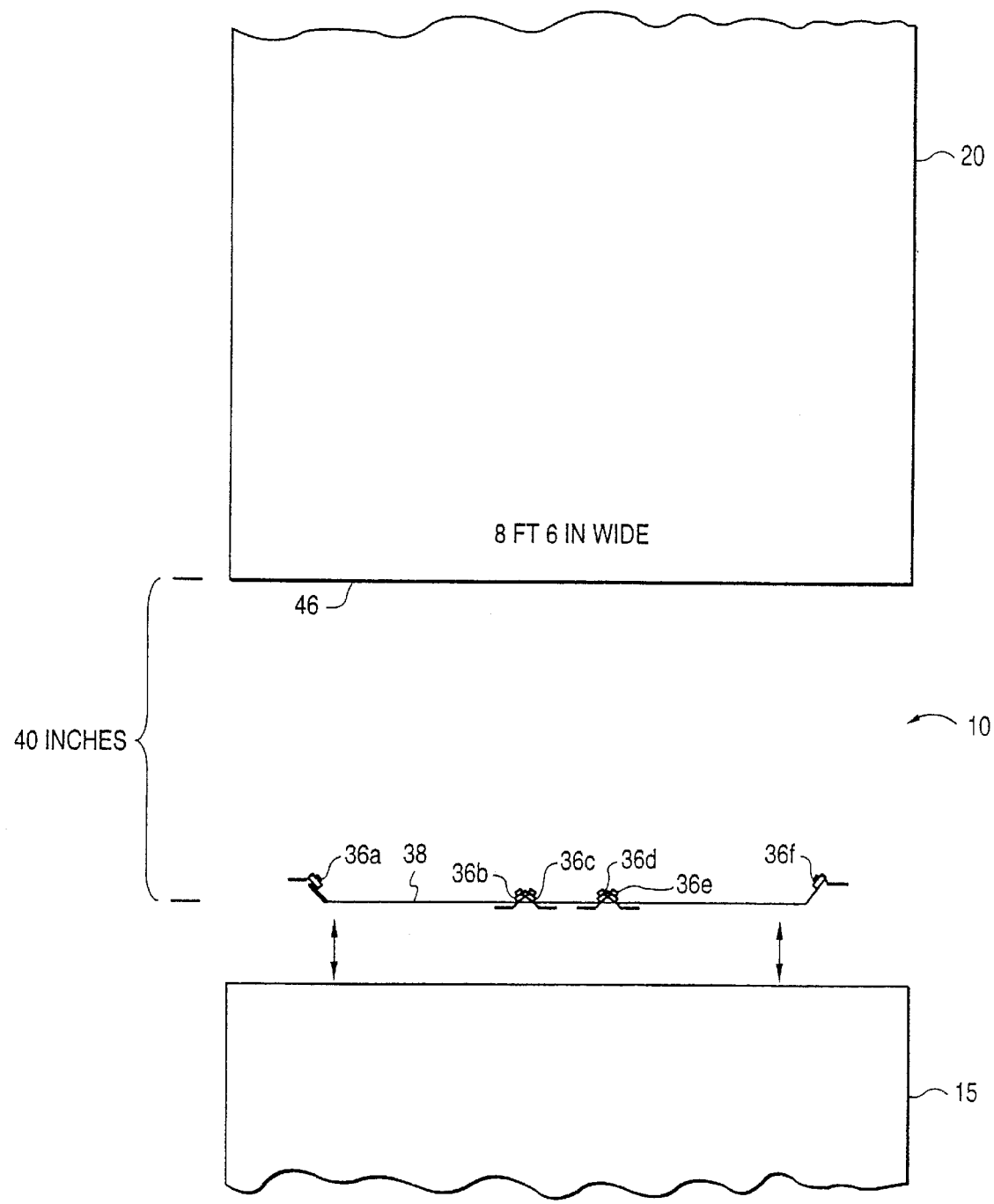

FIGS. 1A, 1B, 1C, and 1D illustrate an articulated vehicle 10 having a trailer 20 coupled to a tractor 15 and which is equipped with the vehicle safety system of the instant invention. FIG. 1A is a left side view of articulated vehicle 10; FIG. 1B is a right side view of articulated vehicle 10; FIG. 1C is a rear view of articulated vehicle 10; and FIG. 1D is an upper plan view of a portion of articulated vehicle 10. FIG. 2 is a front view of trailer 20. Although the vehicle safety system of the instant invention will be described below in terms of its application to an articulated vehicle and, in particular, to a tractor-trailer combination, it will be readily apparent that the various features of the invention are not limited in this respect.

FIGS. 1A, 1B, 1C, and 1D illustrate a tractor-trailer combination which includes a tractor 15 having a fifth wheel 22 and which is coupled to trailer 20 in a conventional manner. First and second rotatable spot lights 24 and 26 are mounted on top of the cab of tractor 15. Although spot lights are described herein, other lights such as flood lights may also be used. First rotatable spot light 24 may be turned on to provide a first spot light beam 28. Similarly, second rotatable spot light 26 may be turned on to provide a second spot light beam 30. The spot lights are preferably configured to illuminate areas behind and to the side of the trailer, although the invention is not limited in this respect. First and second rotatable side view mirrors 32 and 34 are secured to the cab of tractor 15. Mirrors 32 and 34 provide a driver with driver's side and passenger's side views, respectively.

The tractor-trailer combination is equipped with a plurality of transducer groups, each transducer group including one or more transducers. The transducers transmit and receive signals such as ultrasonic signals which are used in the determination of the angle between the tractor and the trailer and in the detection of objects proximate to the tractor-trailer as will be described in detail below. With reference to FIG. 1D, transducers 36a–36f attached to a transducer support bar 38 constitute a first transducer group for use in determining an angle between tractor 15 and trailer 20, whereby rotatable mirrors 32 and 34 and rotatable spot lights 24 and 26 may be appropriately rotated. Transducer bar 38 is attached to the back of tractor 15 and is preferably mounted relatively close to the plane of fifth wheel 22 of tractor 15 to ensure that a given tractor can be utilized with many different types and sizes of trailers. It will of course be appreciated that the location of transducer bar 38 may be modified as appropriate for a particular type of tractor 15 and/or trailer 20. Transducer bar 38 may be surface mounted or recessed into the back of tractor 15. In a current embodiment, transducer bar 38 is spaced forty inches from the front panel 46 of trailer 20, although it will be evident that the invention is not limited in this respect. Trailer 20 is illustrated as having a trailer width of eight feet, six inches (8'6"), although it will again be evident that the invention is not limited in this respect. While the use of a transducer bar is convenient, it will be appreciated that the invention is not limited in this respect and the transducers may, for example, be directly mounted on tractor 15.

With reference to FIG. 1A, a transducer 40a is attached to a lower driver side portion of tractor 15. With reference to FIG. 1B, a transducer 40a' is similarly attached to a lower passenger side portion of tractor 15. Transducers 40a and 40a' constitute a second transducer group for use in detecting objects on either side of tractor 15, whereby a driver may then be informed of the detection of such objects. These objects may include other vehicles, buildings, trees, etc.

With reference to FIG. 1A, transducers 42a–42j are attached to a left side panel 44 of trailer 20. With reference to FIG. 1B, transducers 42a'–42j' are similarly arranged on a right side panel 45 of trailer 20 opposite to left side panel 44. Transducers 42a–42e and 42a'–42e' are spaced approximately equidistantly across the upper edge of the respective left and right side panels of trailer 20. Similarly, transducers 42f–42j and 42f'–42j' are spaced approximately equidistantly across the lower edge of the respective left and right side panels of trailer 20. Transducers 42a–42j and 42a'–42j' constitute a third transducer group for use in detecting objects on either side of trailer 20, whereby a driver may then be informed of the detection of such objects. Although respective transducers 42a–42e and 42a'–42e' are illustrated as being vertically aligned with corresponding ones of transducers 42f–42j and 42f'–42j', transducers 42a–42e and 42a'–42e' can alternatively be offset relative to corresponding ones of transducers 42f–42j and 42f'–42j'.

With reference to FIG. 2, transducers 44a and 44b are attached to an upper portion of front panel 46 of trailer 20. Transducers 44a and 44b constitute a fourth transducer group for use in detecting whether there is sufficient clearance for trailer 20 to pass under or through tunnels, bridges, tree limbs, viaducts, and the like, whereby a driver may then be informed of the detection of such objects.

With reference to FIG. 1C, transducers 48a and 48b are attached to an upper portion of rear panel 50 of trailer 20. Transducers 48a and 48b constitute a fifth transducer group for use in detecting whether there is sufficient clearance for trailer 20 to pass under or through tunnels, bridges, tree limbs, viaducts, and the like, whereby a driver may then be informed of the detection of such objects.

Transducer 52 is attached to an extension 50a of rear panel 50. Transducer 52 constitutes a sixth transducer group for use in detecting objects behind trailer 20, whereby a driver may then be informed of the detection of such objects.

Transducers 54a and 54b are attached to a lower portion of rear panel 50 of trailer 20. Transducers 54a and 54b constitute a seventh transducer group for use in determining distance and/or orientation of trailer 20 relative to a structure such as a loading dock, whereby a driver may then be informed of such distance and/or orientation. "Structure" as used herein is not limited to a loading dock and may refer to other natural and man-made constructs such as bridges, viaducts, trees, etc.

Figure 3:
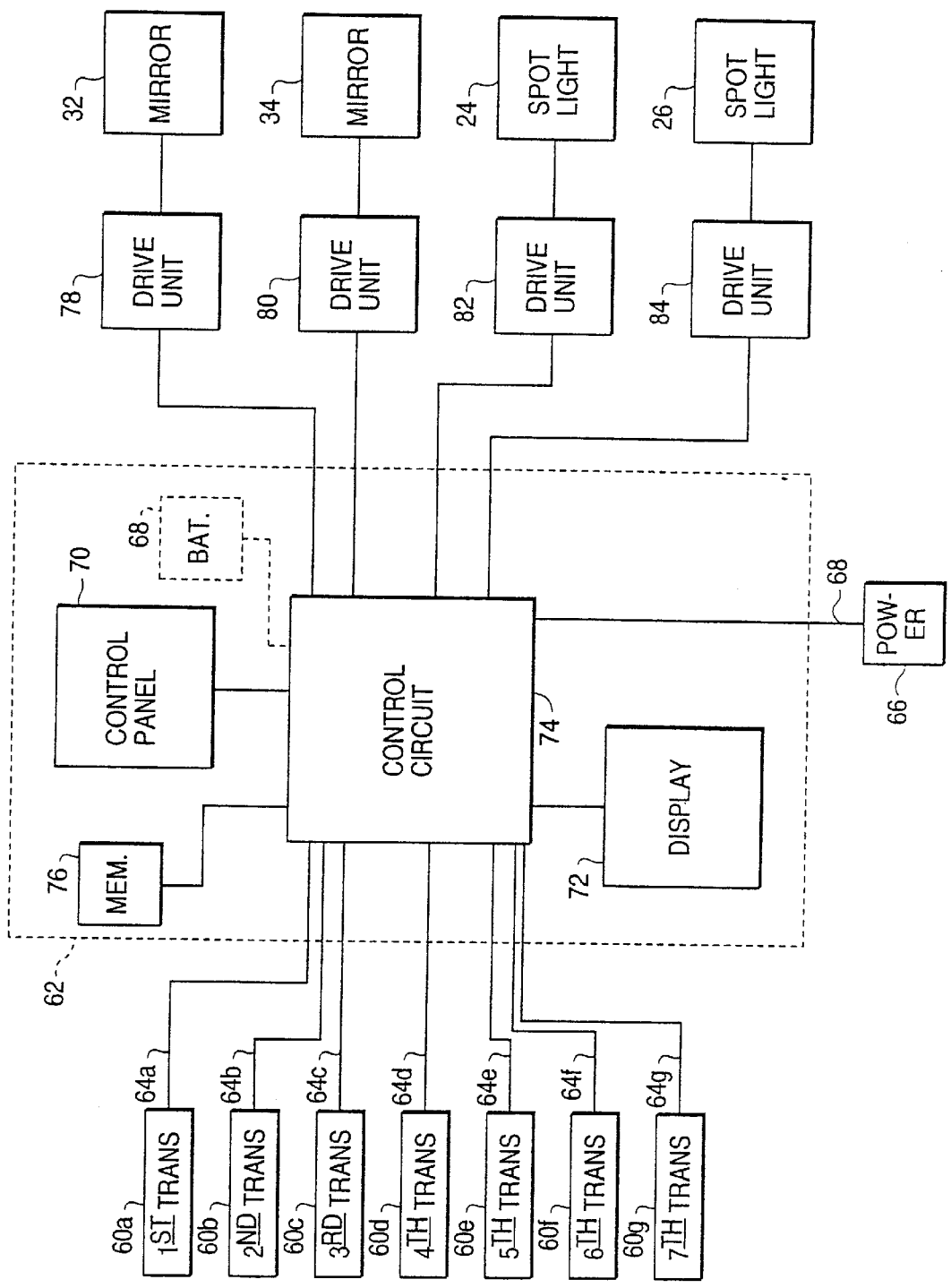
FIG. 3 is a block diagram of the vehicle safety system of the instant invention.

FIG. 3 is a system block diagram of the vehicle safety system in accordance with the instant invention. The first, second, third, fourth, fifth, sixth, and seventh transducer groups have been designated 60a, 60b, 60c, 60d, 60e, 60f, and 60g, respectively. Transducer groups 60a–60g are coupled to a control unit 62 over respective communication paths 64a–64g. Communication paths 64a–64g may be wired or wireless communication paths and the invention is not limited in this respect. A power source 66 supplies power over power line 68 to control unit 62. Power source 66 may, for example, be the electrical system of the vehicle or an external battery. If it is desired to operate the apparatus on a voltage lower than that supplied by the vehicle, a voltage lowering device such as resistor or a zener diode may be placed between the power source and control unit 62. Alternatively, a replaceable internal battery 68 may be included in control unit 62. A control panel 70 provides an interface with control unit 62 for the driver. A display 72 is used to visually communicate information to the driver. If desired, a speaker (not shown) may also be provided to aurally communicate information to the driver. Control unit 62 includes a control circuit 74 such as a microprocessor which controls transducer groups 60a–60g and display 72 and which processes driver inputs which are input via control panel 70. Control circuit 74 may, for example, be a microchip such as a model 68HC-11 available from Motorola. Other microchips which may be utilized include a Z-80 available from Zilog or an HD647180 from Hitachi. A memory 76 stores operating programs and other information which are used by control circuit 74. The operating programs are preferably factory-loaded and include a routine for generating mirror control signals and spot light control signals for appropriately rotating mirrors 32, 34 and spot lights 24, 26 in accordance with information which is supplied from first transducer group 60a as will be described below. Drive units 78 and 80 receive the mirror control signals and appropriately rotate mirrors 32 and 34, respectively. Drive units 82 and 84 receive the spot light control signals and appropriately rotate spot lights 24 and 26, respectively. The mirror control signals and the spot light control signals are preferably supplied to the drive units over wired communication paths, but wireless communication paths may also be used. As will be discussed below, the programs stored in memory 76 also include routines for using the information supplied from transducer groups 60b–60g to provide information to the driver regarding proximate objects and/or the orientation of the vehicle as well as for controlling the ultrasonic transducers.

Figure 4:
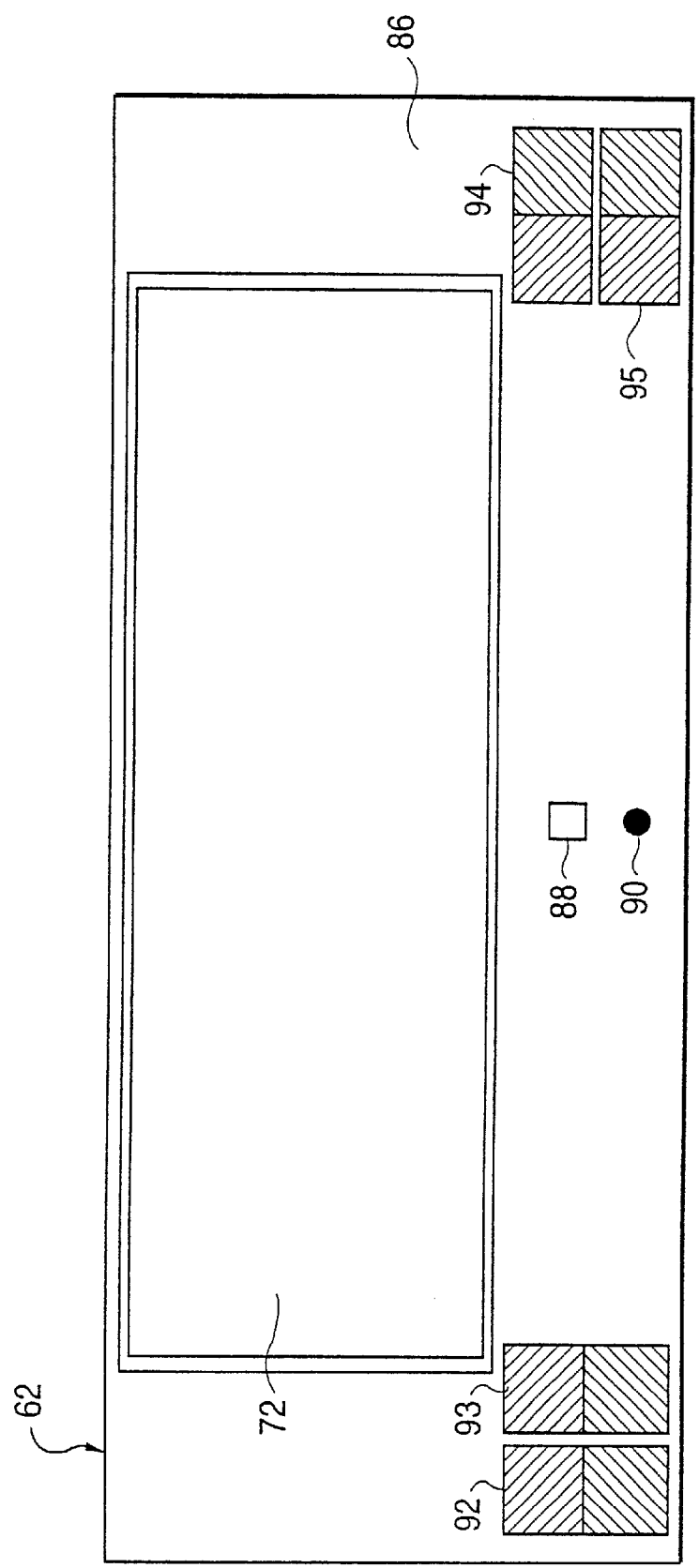
FIG. 4 is a diagram of control panel 70 of control unit 62 shown in FIG. 3.

FIG. 4 is an illustration of the front panel 86 of control unit 62. Control unit 62 is mounted in the passenger compartment of tractor 15 such as on the dashboard, for example, and has an outer housing made of, for example, aluminum or a heavy grade durable plastic. Manual master ON/OFF power switch 88 controls the application of power from power source 66 to control unit 62. When in the ON position, power is coupled from power source 66 to control unit 62. Master switch ON signal 90 such as a light emitting diode (LED) is illuminated when power switch 88 is in the ON position. If the automatic mirror rotating function is not desired, power switch 88 may be moved to the OFF position. In this case, one or both mirrors remain or are controlled to return to a neutral or normal position for straight ahead driving. Momentary center-off rocker switches 92–95 are also provided on front panel 86. Rocker switches 92 and 93 are momentary up/down rocker switches and rocker switches 94 and 95 are momentary right-left rocker switches. Rocker switch 94 may be actuated to set a "normal" or neutral position of the mirrors. Rocker switch 95 may be actuated to sweep the mirrors outward and then return the mirrors to the normal position. Rocker switches 92 and 93 allow the selection of functions and the input of data. For example, if the control unit is configured to accept the input of set-up information by the driver, rocker switch 92 may be used to move through the different types of set-up information to be input and rocker switch 93 may be used to set particular values of the set-up information by, for example, incrementing or decrementing a data value by some predetermined amount each time the rocker switch is actuated. In general, rocker switch 92 is actuated to switch from normal operation mode to a set-up mode and to move through the various set-up functions and rocker switch 93 is actuated to set and/or select various options within a particular set-up function. Of course, other control panel arrangements including keypads, pushbuttons, joysticks, and the like may be utilized and the invention is not limited in this respect. Other mirror positioning functions such as up/down tilt may also be provided, if desired.

Figure 5:
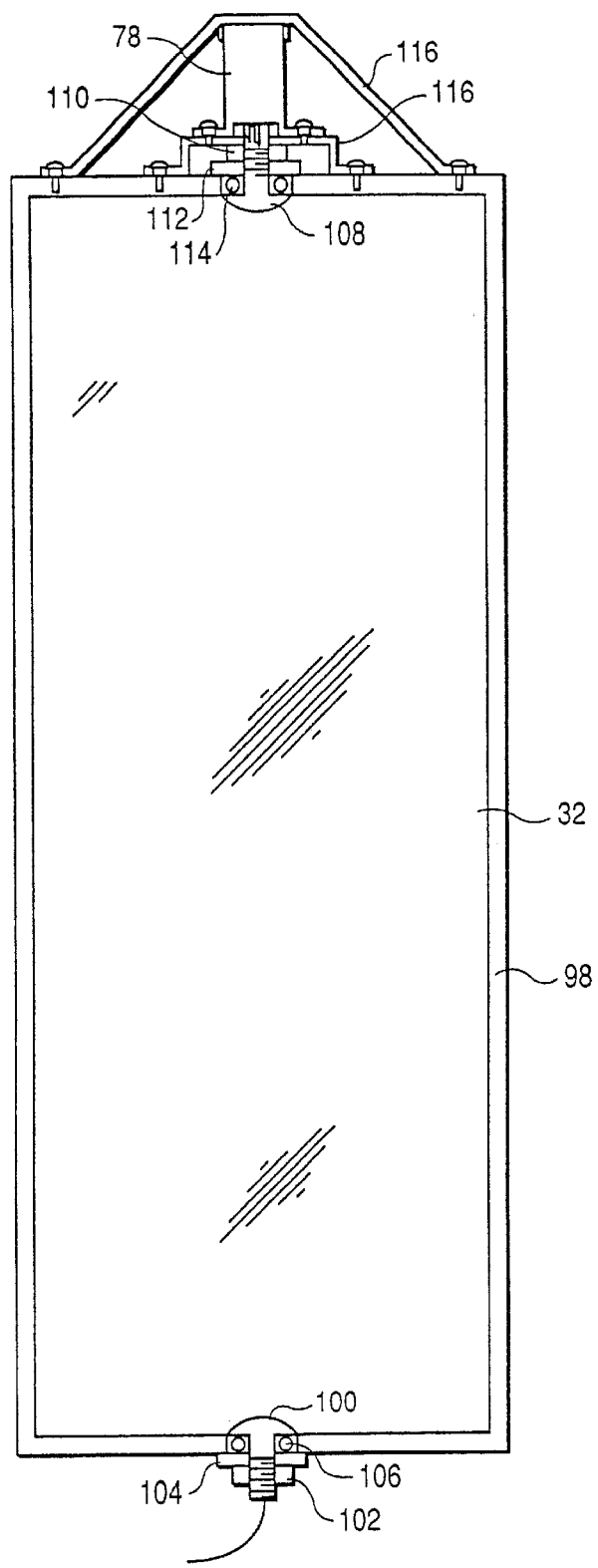
FIG. 5 is a diagram illustrating rotating mirror 32 and associated drive unit 78 for rotating mirror 2.
Figure 6:
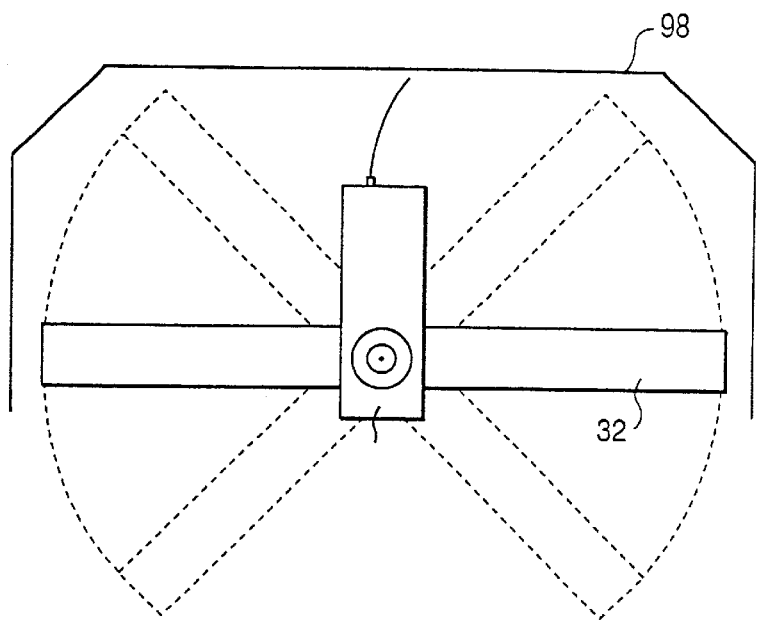
FIG. 6 illustrates the range of rotation of rotating mirror 32.

FIG. 5 illustrates mirror 32 and its respective drive unit 78. Mirror 32 is mounted in mirror housing 98 at its lower end by bottom mirror drive axle 100, retaining nut 102, washer 104, and greased seal bearing 106. At its upper end mirror 32 is mounted in mirror housing 98 by top mirror drive axle 108, retaining nut 110, washer 112, and greased seal bearing 114. Drive unit 78 is mounted on top mirror drive axle 108 by mounting brackets 116 and controls the rotation of mirror 32. Mirror 32 rotates on bottom mirror drive axle 100 and top mirror drive axle 108. FIG. 6 illustrates the range of motion of mirror 32 within mirror housing 98. Of course, the details of the mirror and drive unit described above are for illustrative purposes, and many different mirrors and drive units with and without mirror housings may be utilized. Mirror 34 and drive unit 80 may be similarly arranged.

In order to effect appropriate rotation of mirrors 32 and 34, control circuit 74 monitors the angle between tractor 15 and trailer 20. If this angle exceeds a predetermined angle such as three degrees, for example, during execution of a turning maneuver, control circuit 74 generates mirror control signals for controlling the rotation of mirror(s) 32, 34. The above-mentioned predetermined angle defines a so-called null zone in which no mirror rotation is effected and is provided to prevent minor steering corrections or simple lane changes from causing rotation of the mirrors. The null zone setting is configurable and may be set in memory 76 at the factory or by the driver using the rocker switches of the control panel. The null zone may of course be set to zero whereby mirror rotation is effected at all angles of the tractor and trailer. Based on the angle between tractor 15 and trailer 20 and other information such as the length of trailer 20, an appropriate angle for rotating mirror(s) 32, 34 may be determined. Control circuit 74 then generates mirror control signals for effecting the mirror rotation and supplies the mirror control signals to the servomotors of drive units 78, 80 which drive the rotation of mirrors 32, 34, respectively. After the turn is complete and the angle between tractor 15 and trailer 20 returns to a value in the "null zone", the mirrors 32, 34 are rotated to their initial straight-viewing position.

With respect to transducer group 60*a*, when power switch 88 is moved to the ON position, control circuit 74 activates appropriate transducers of the transducer group 60*a* using transducer control signals. The transducer control signals from control circuit 74 are emitted for example, at a rate of eleven times per second, and are changed ("transduced") by the transducers into ultrasonic sound waves having a speed of approximately 746 miles per hour. Based on the time it takes for ultrasonic sound waves to be reflected or echoed back and detected by the transducers, control circuit 74 calculates the distances between the respective transducers and the object which reflected the waves. Specifically, the operation of the transducers is controlled and timed by control circuit 74. An appropriate transducer is activated for a first short period of time by a pulse from control circuit 74. This pulse is converted into sound waves as discussed above and transmitted by the transducer for the first short period of time. Control circuit 74 then signals that transducer (or another transducer as will be explained below) to prepare to receive sound waves which have been bounced off front panel 46 of trailer 20. The transducer is activated to receive the returning sound waves only for a second short period of time. Once a transducer has transmitted and/or received its signals, it may be reactivated by control circuit 74 or control circuit 74 may activate another transducer. Instead, control circuit 74 activates another transducer, if any, using the same sequence of transmission and receiving steps. As a result, each transducer receives only the sound waves which it has transmitted, and distortion of the signal due to the operation of other transducers is eliminated. Further, because the transmission and receiving periods for each transducer are very short, interference from external sources is minimized. Distortion due to the operation of other transducers may also be reduced by using transducers which generate ultrasonic signals having different frequencies.

Figure 7:
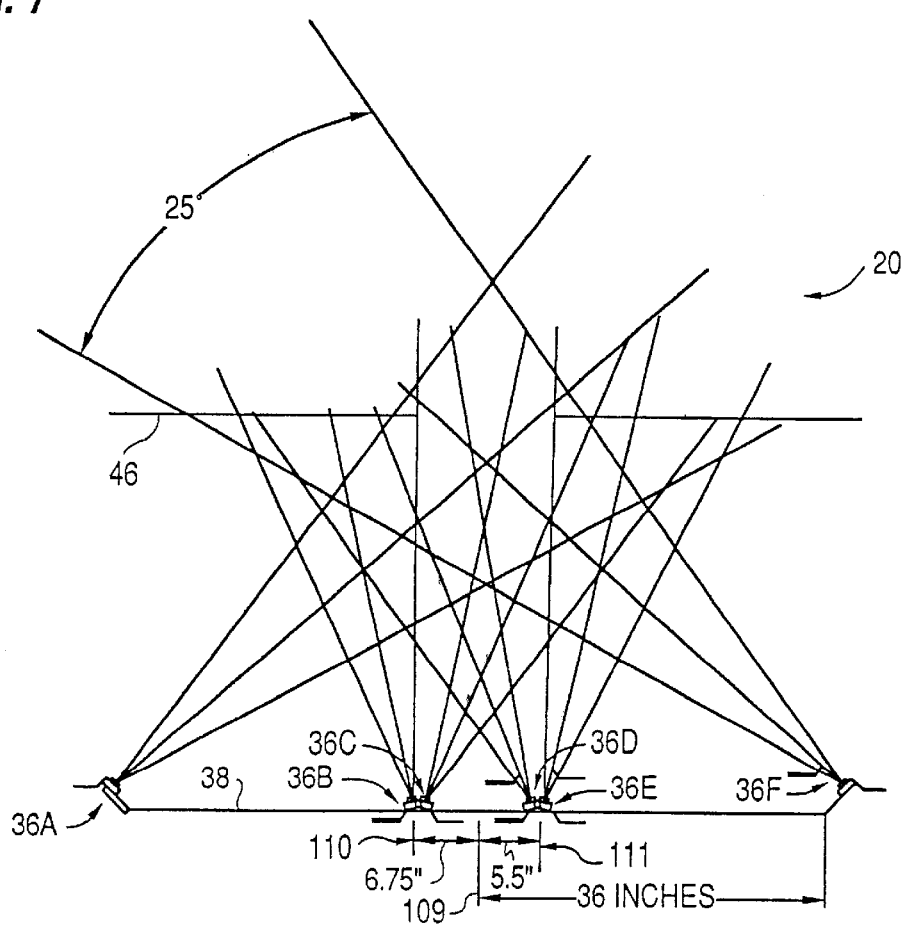
FIG. 7 illustrates the operation of the first transducer group of FIG. 3 for determining an angle between tractor 15 and trailer 20.
Figure 8:
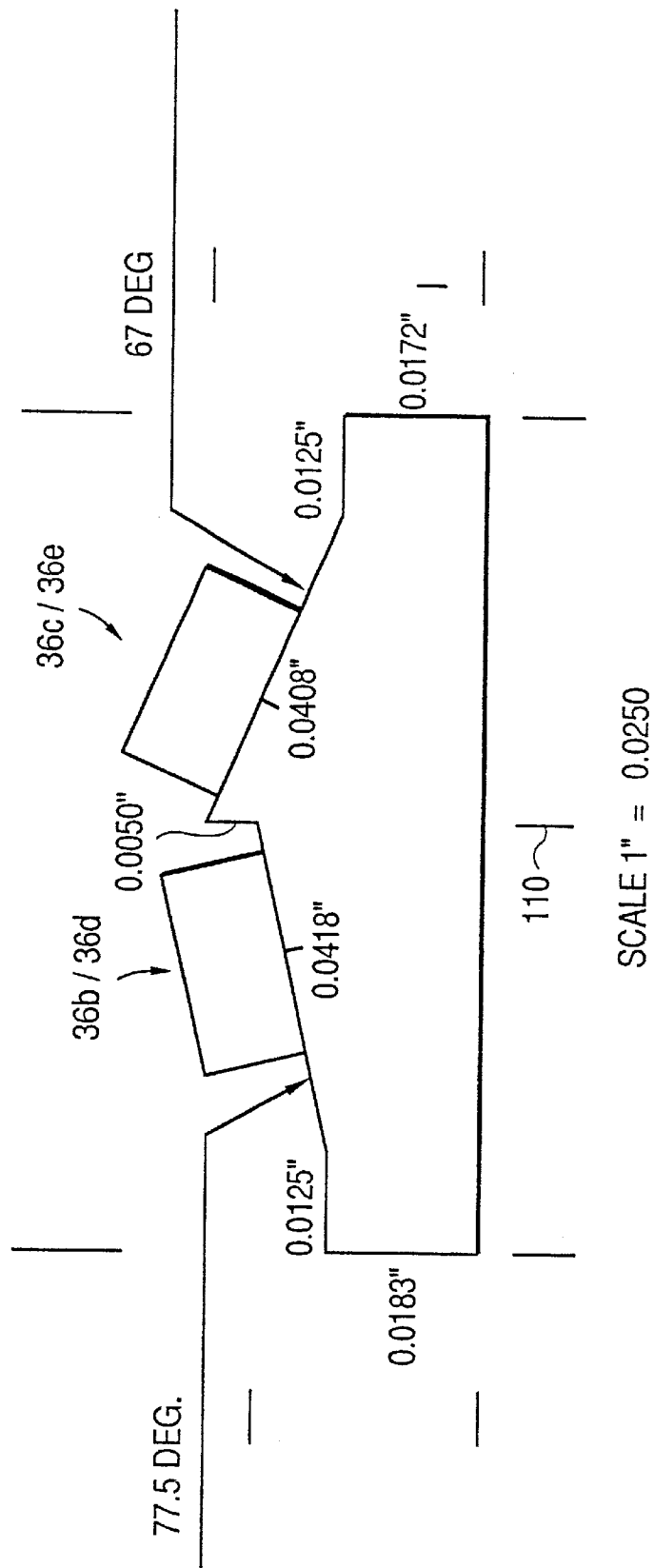
FIG. 8 is a diagram illustrating an arrangement of a transducer pair in the first transducer group shown in FIG. 7.

FIGS. 7–9 will be used to explain the detailed operation of first transducer group 60*a*. As noted above, first transducer group 60*a* is used in the determination of the angle between the back of tractor 15 and front panel 46 of trailer 20. Specifically, transducer bar 38 is positioned on the back of tractor 15 and includes six transducers 36*a*–36*f*. Transducers 36*b* and 36*c* constitute a first transducer pair and transducers 36*d* and 36*e* constitute a second transducer pair. With reference to FIG. 7, the center line 110 of the first transducer pair is spaced approximately 6.75 inches from the center line 109 of transducer bar 38 and the center line 111 of the second transducer pair is spaced approximately 5.5 inches from the center line 109 of transducer bar 38. The respective transducers of the first and second transducer pairs are positioned at the angles and positions shown in FIG. 8. Transducer 36*a* is positioned at a 45 degree angle relative to transducer bar 38 and the center of transducer 36*a* is six inches "up" from the transducer bar. Similarly, transducer 36*e* is positioned at a 45 degree angle relative to transducer bar 38 and the center of transducer 36*e* is six inches "up" from the transducer bar. Transducers 36*a*–36*f* are responsive to transducer control signals from control circuit 74 over communication path 64*a* for generating and transmitting respective ultrasonic sound waves which strike front panel 46 of trailer 20 and are reflected back to the transducers. By measuring the time taken for the respective transmitted ultrasonic sound waves to be reflected back to the corresponding transducers, the respective distances between the transducers and trailer 20 can be determined. These distances may then be used to determine the relative angle of tractor 15 and trailer 20 as will be explained below. Transducers 36*a*–36*f* each preferably have a beamwidth of approximately 25 degrees (see FIG. 7) and are preferably suited for both wet and dry use so as to be operable in varying weather conditions. Commercially available transducers such as those used for determining depth may be utilized. Such transducers are manufactured, for example, by Polaroid.

In general, throughout a 90 degree turn either side of center ("center" referring to when the tractor and trailer are aligned), more than one of transducers 36*a*–36*f* is opposite a surface portion of front panel 46 of trailer 20, whereby an echo will be returned. However, not every surface portion from which an echo can be "bounced" will have sufficient linear movement towards or away from the transducer to resolve increments of the turning motion. For example, reflections from surface portions located near the pivot point (king pin) are less useful for determining the angle between tractor 15 and trailer 20 since the linear movement of these portions changes very little per degree of turning. Accordingly, the transducers used in the angle determination should be arranged such that at all angles of interest there is at least one transducer which is opposite a surface portion of front panel 46 of trailer 20 having sufficient linear motion to resolve increments of turning motion. Using the echo, the distance between the front panel 46 and the transducer can be determined. From this determined distance, the angle between tractor 15 and trailer 20 may be found using a look-up table which relates the distance determined using the transducer to the angle between the tractor and the trailer. If desired, the validity of the distance measurement may be confirmed using a transducer which has a valid echo, but which is not as well suited for use in distance measurement itself because, for example, it is opposite a surface portion of the front panel of the trailer having insufficient linear movement. Such confirming measurements are a preferred arrangement since there are enough potential different anomalous reflections or echoes that could be received which could lead to erroneous angle determinations. Thus, where possible, at a given unique angular position, there will be a first measuring reflection path and one or more confirming reflection paths. The confirming measurement need only be within a certain limit for confirmation. Thus, if for example, something is dangling from back of trailer or another vehicle is in near proximity, it is possible that false echoes may be generated which might lead to an erroneous distance measurement and thus to an erroneous angle calculation. However, using a confirming measuring path, such an erroneous measurement may be invalidated, thereby preventing the erroneous report of the trailer angle.

In accordance with the instant invention, control circuit 74 executes both a find sequence and a follow sequence. The follow sequence is dependent upon having a valid previous measurement in order to thereby predict which transducer should now be activated to determine the current angle. The find sequence steps through the various paths looking for a valid reading in which a particular measurement and its confirming path are verified.

The specific operation of transducer group 60a will now be explained. As described above, the ultrasound distance measurement hardware consists of six transducers 36a–36f placed at specific positions and specific angles relative to the pivot point (king pin) of trailer 20. A standard distance from the king pin to front panel 46 of trailer 20, a standard width of the front panel of 8.5 feet, a specific spacing (i.e., forty inches) between front panel 46 and transducer bar 38 provide the geometric basis for distance measurements. Two standard Polaroid 615077 "Sonar Ranging Modules", three relays to select desired pairs of transducers to be activated, and a circuit board with clock generator, elapsed time counter/latch, and appropriate port/interrupt functions that interface to control circuit 74 complete the hardware dedicated to sonar distance measurement.

The operating program for the distance measurements includes a "FIND/FOLLOW" program which is a functional block constructed of smaller functional blocks, which select one at a time of ten distinct "echo paths." The first six paths (A through F) use the single transducer designated by that letter as transmitter and receiver, also referred to as a "direct" path. Thus, path A uses transducer 36a as the transmitter and receiver; path B uses transducer 36b as the transmitter and receiver; etc. The other four paths (G, H, I, and J) each use a respective combination of two transducers: one as the transmitter and the other as the receiver. Path G uses transducer 36a as the transmitter and transducer 36b as the receiver; path H uses transducer 36f as the transmitter and transducer 36c as the receiver; path I uses transducer 36a as the transmitter and transducer 36d as the receiver; and path J uses transducer 36f as the transmitter and transducer 36e as the receiver.

A look-up table of values collected from empirical tests contains 181 entries corresponding to a zero-degree position and 180 distinct one-degree positions. Each of these entries contains the identities of which of the ten paths will return a valid distance echo from a trailer surface, the distance of that echo, and whether that measured distance can be used to resolve the trailer position, or to simply "confirm" the validity of a distance measured by another of the ten paths at that increment of trailer angle. The use of a second distance measurement for confirmation is simpler to implement than to individually provide for all possible anomalous echoes that might occur at 181 unique angular positions.

The "follow" function assumes that the angle of trailer 20 relative to tractor 15 is known, and uses the look-up table both to decide which echo paths to measure, and what trailer angle the distance measurements indicate.

The "find" functions assumes the position of trailer 20 is, for whatever reason, not known, and checks the ten paths until it finds a valid measured distance that matches one in the table, or failing to do so, reports "not found."

In a current embodiment, the mapping of trailer angle-to-mirror angle is a simple 181-entry table. The values in the table may be incrementally computed, for example, from a function such as a complex polynomial, which is in turn derived by curve-fitting to data points derived from an AutoCad® simulation of the driver's, mirrors' and trailer's relative position in two dimensions. Thus, in such an embodiment, values such as trailer length, distances from the driver to the mirrors, and distances from the fifth wheel to the mirrors which may be used to determine the amount of mirror rotation are predetermined. Alternatively, any or all of these data values may be entered by the driver. In this case, control circuit 74 executes an algorithm which utilizes the polynomial and these data values to determine the mirror angle based on the tractor-trailer angle. If a table is used, control unit 62 may be modified to include a data port for inputting tables relating mirror angle to trailer angle to memory 76. In this way, memory 76 may be updated so that the tractor may be used with trailers of different lengths, etc. Control signals for rotating the rotatable spot lights may be generated in the same manner as the control signals for rotating the mirrors.

The table of FIG. 9 illustrates a table used in finding or following the trailer angle. In the table, a trailer angle of "0" (i.e., parallel to the tractor centerline) is designated as 90 degrees. There are eight values stored for each of the twenty entries. Specifically, "segment path" refers to the position of this segment of 181 positions. The 0 degree reference point is the trailer at a 90 degree angle to the driver's right. From this position (0) through 12 degrees, the other seven values define the upper and lower limits of valid distance measurement. "Main measurement" specifies which of the transducer paths A through I is used to determine trailer angle in this segment. "Conflict measurement 1" specifies a first transducer path, if any, which can be used to confirm the validity of the distance measured by "main measurement." A "0" indicates there is no confirming path. "Conflict measurement 2" specifies a second transducer path, if any, which can be used to confirm the validity of the distance measured by "main measurement" and resolve any ambiguities. "Path start" is the lower limit in degrees for which the given segment is valid. "Path stop" is the upper limit in degrees for which the given segment is valid. "Start measurement" is the echo distance to the trailer, in hundredths of an inch, that corresponds to the "path start" angle. "Stop measurement" is the echo distance to the trailer, in hundredths of an inch, corresponding to the trailer angle equal to the "path stop" angle. Comparing the distance measured by a specific transducer path to the upper and lower limits of each of these twenty segments narrows down the subsequent search for the specific trailer angle that corresponds to that measured echo distance. Since eleven measurements are taken per second, these measurements are averaged to determine the distance which is used to access the look-up table.

Accordingly, the transducer system as illustrated in FIGS. 7 and 8 enables control circuit 74 to calculate the angle of trailer 20 relative to tractor 15 based on the distances between the back of tractor 15 and front panel 46 of trailer 20 determined by transducers 36a–36f which are controlled as discussed above. It is noted that transducers 36a–36f may also be used to determine the angle between a loading dock or other object relative to the rear of the vehicle when tractor 15 is not attached to a trailer.

As discussed above, mirror control signals and spot light control signals for respectively controlling mirrors 32, 34 and spot lights 24, 26 are generated by control circuit 74. These control signals are supplied to drive units 78, 80, and 82, 84 for appropriately controlling rotation of mirrors 32, 34 and spot lights 24, 26. The signals are supplied to the appropriate driver units in a very short period of time, for example, at a rate of eleven times per second, thereby permitting precise movement of the mirrors and spotlights. The system of the instant invention may be set up so that when the tractor-trailer is turned in one direction both mirrors turn in which case, for example, in turning left, the left mirror rotates to enable viewing the rear of the vehicle while the right mirror rotates in the same direction providing no additional assistance; or the system may be set up so that during a left turn only the left mirror rotates and during a right turn only the right mirror rotates. As noted above, the communication paths between control unit 74 and drive units 78, 80, 82, and 84 are preferably wired communication paths, but wireless communication paths may also be used.

Control circuit 74 may further include a warning routine which generates a warning signal, for example an audible warning signal via a speaker, when the angle between tractor 15 and trailer 20 is 90 degrees and the tractor and trailer are in a "jackknife" position. The audible warning may be a voice warning such as "Warning! The trailer is in a jackknife position." In addition or alternatively, a visual warning of the jackknife position may be provided on display 72.

Control circuit 74 follows trailer 20 through its full range of 180 degrees relative to tractor 15. In the event the transducers of first transducer group 60a determine that no trailer is hooked up to tractor 15, control circuit 74 preferably automatically resets mirrors 32 and 34 to the normal position. The transducer groups may also be disabled by moving power switch 88 to the OFF position when no trailer is attached to the vehicle. Furthermore, any malfunction of the transducers or other components results in control circuit 74 returning and maintaining the mirrors in the neutral position until the faulty part is repaired.

Figure 10A:
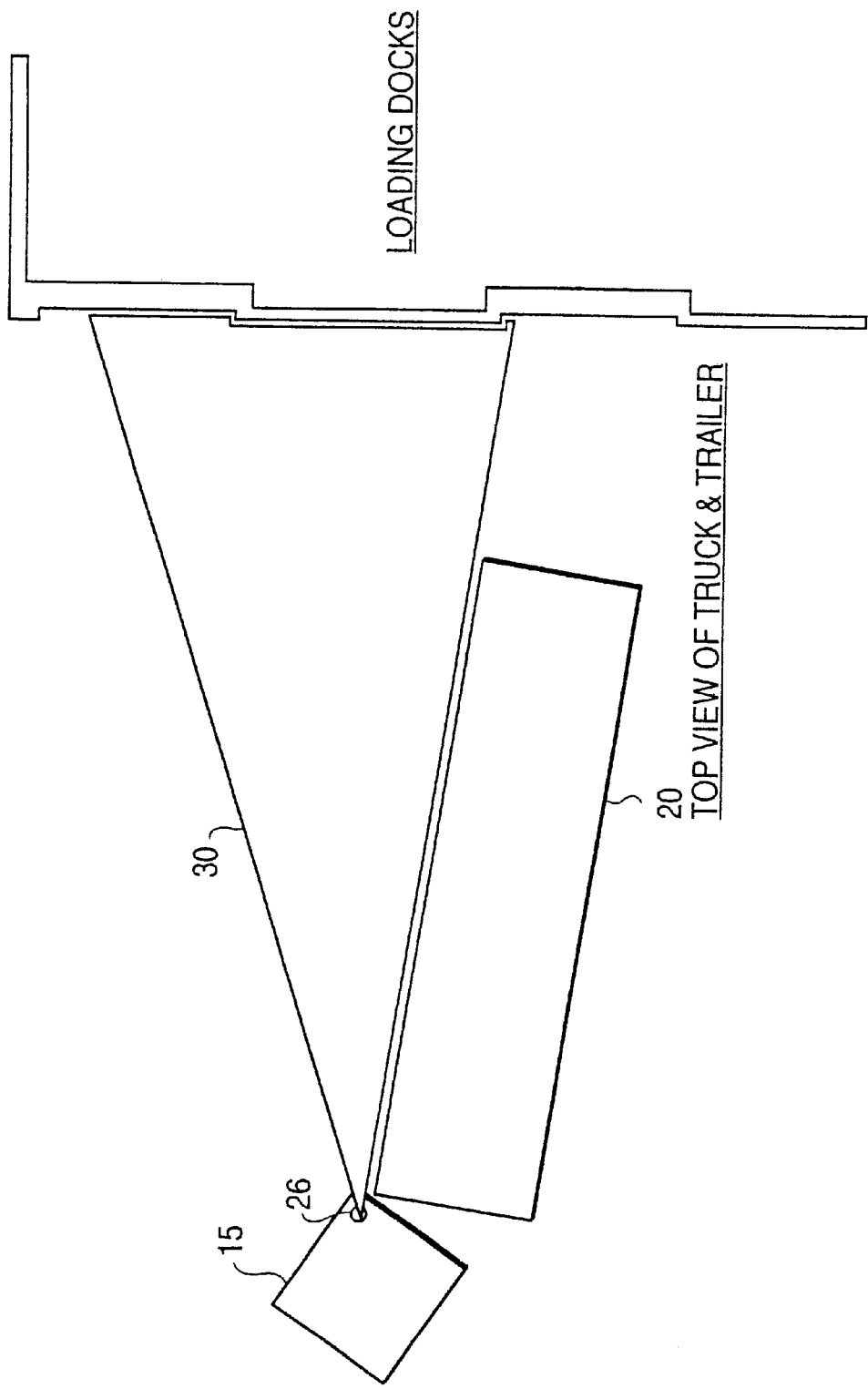
FIGS. 10A and 10B illustrate the light beams of spot lights 24 and 26.
Figure 10B:
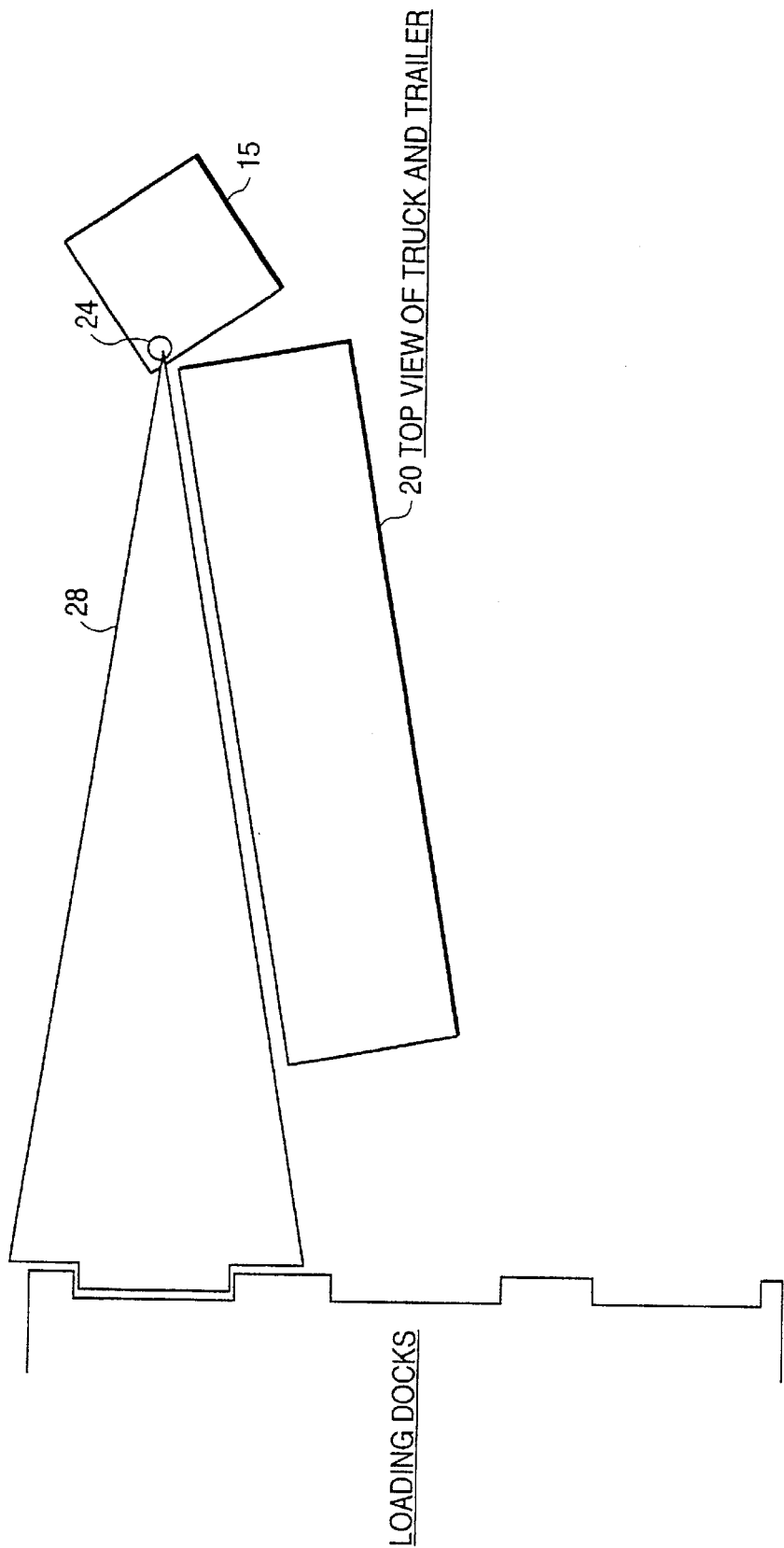

The first transducer group thus generates appropriate control signals for rotating a mirror to permit viewing down the length of a trailer towards a dock or a loading area and rotating a spot light to brighten this area. Spot lights 24 and 26 may, for example, be manually activated and then automatically track the rear side of the trailer on either side of the trailer until manually deactivated. As shown in FIG. 10A, rotatable spot light 26 positioned on the right rear corner of the top of tractor 15 lights the area to the right side and right rear of trailer 20. Similarly, as shown in FIG. 10B, rotatable spot light 24 positioned on the left rear corner of the top of tractor 15 lights the area to the left side and left rear of trailer 20.

Figure 11A:
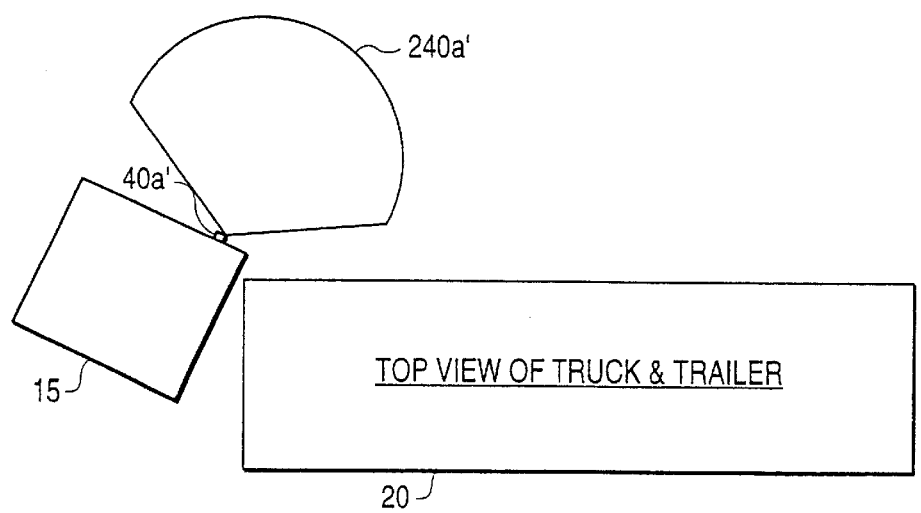
FIGS. 11A and 11B illustrate the beams associated with transducers of the second transducer group.
Figure 11B:
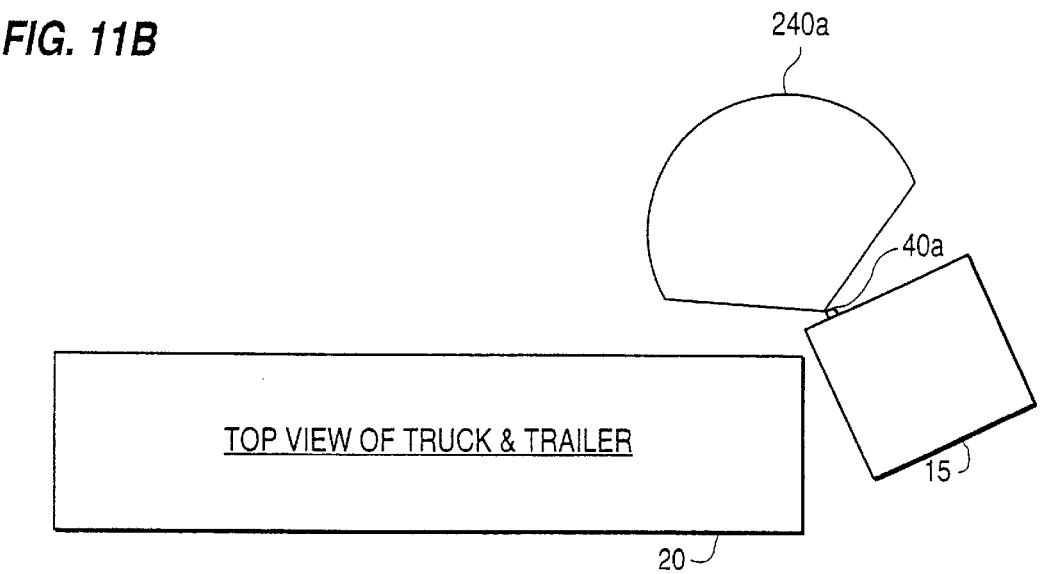
Figure 12A:
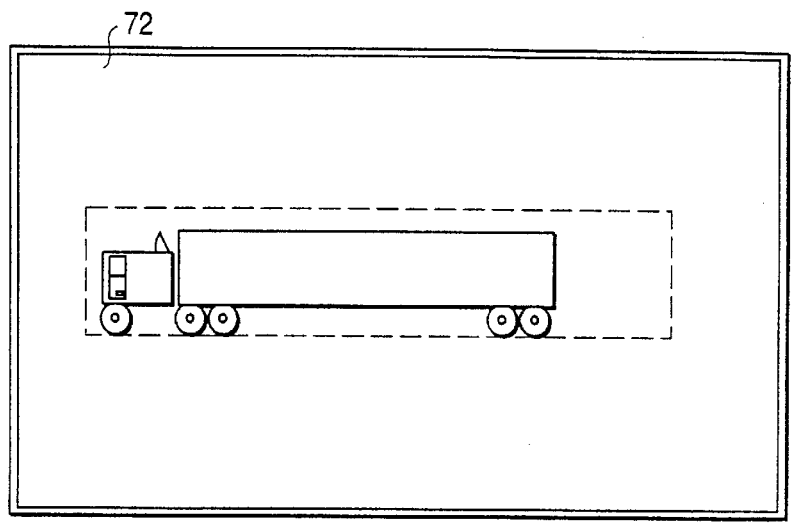
FIGS. 12A, 12B, and 12C illustrate graphic representations for display on display 72.
Figure 12B:
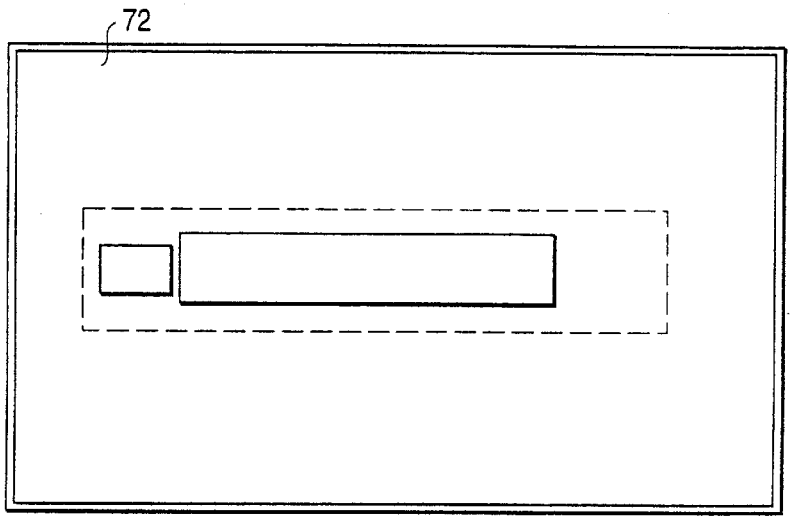
Figure 12C:
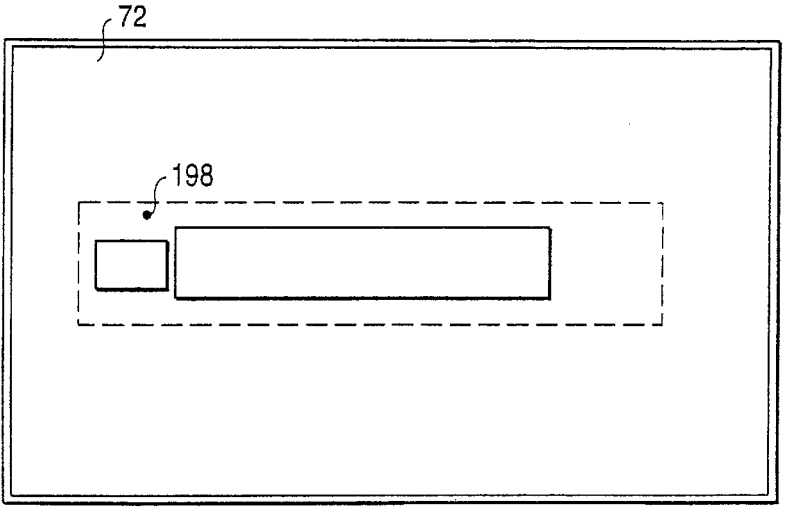

The operation of second transducer group 60b will now be described in detail with reference to FIGS. 11A and 11B. Second transducer group 60b is constituted by transducers 40a and 40a' and is used in the detecting of objects on either side of tractor 15, whereby a driver may be informed of the detection of such objects. As shown in upper plan views of FIGS. 11A and 11B, transducers 40a and 40a' emit respective ultrasonic beams 240a and 240a' to detect objects located within the respective beamwidths. Specifically, control circuit 74 supplies transducer control signals for sequentially activating transducers 40a and 40a'. If a wave is reflected back to the transducers, control circuit 74 determines that an object is present and can calculate the distance from the activated transducer to the detected object. If no wave is reflected back to the transducers, control circuit 74 determines that no object is present. In response to these determinations, control circuit 74 communicates information to the driver. Control circuit 74 may be configured to communicate information regarding detected objects and/or to communicate information indicating that a particular area is clear of any objects. The information may be communicated audibly using a speaker and/or visually using display 72. Display 72 may be a liquid crystal display, a light emitting diode display, a plasma display, or some other type of display for providing a graphic representation of the tractor-trailer as shown in FIGS. 12A and 12B. Specifically, FIG. 12A shows a graphic representation of a left side view of the tractor-trailer and FIG. 12B shows a graphic representation of an upper plan view of the tractor-trailer. Information regarding an objects detected by transducers 40a and 40a' may be provided on the graphic representations of FIGS. 12A and 12B. For example, assume that transducer 40a detects the presence of an object. The graphical representation of FIG. 12C would provide an immediate indication to a driver that an object 198 was located proximate to the passenger side of tractor 15. The visibility of the location of the object on display portion 72 may be improved by displaying the detected object in a different color than the color of the outline used to display the upper plan view of the tractor-trailer.

Figure 13:
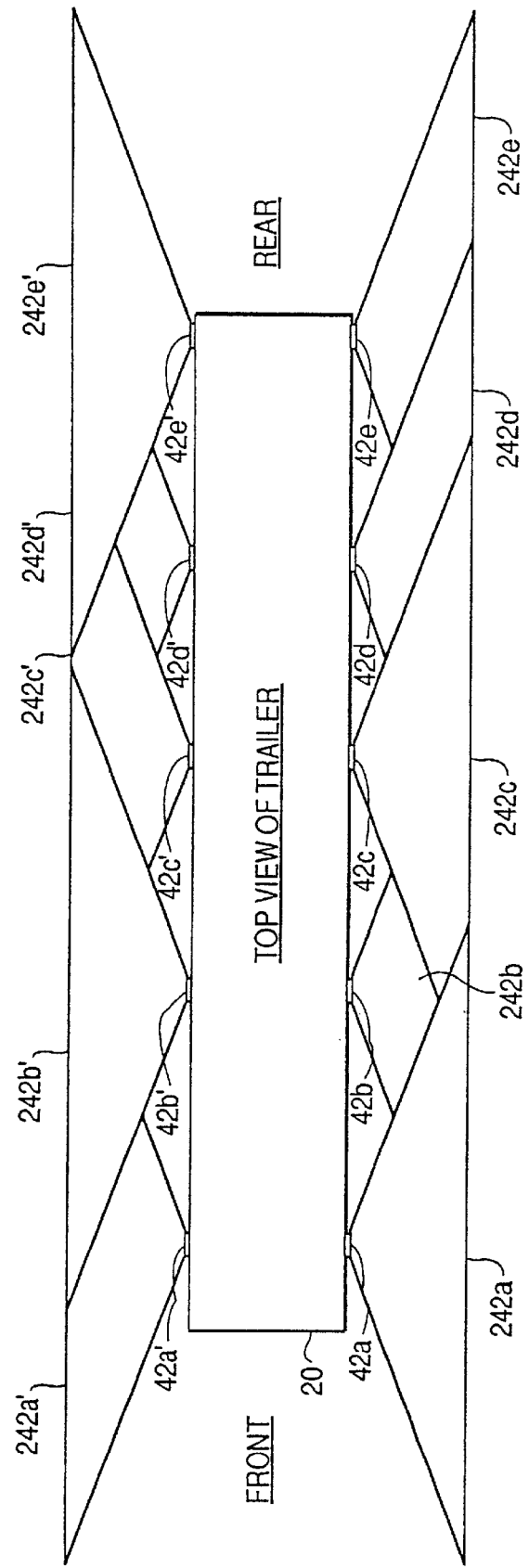
FIG. 13 illustrates the beams associated with transducers of the third transducer group.

The operation of third transducer group 60c will now be described in detail with reference to FIG. 13. Third transducer group 60b is constituted by transducers 42a–42j and 42a'–42j' and is used the detecting of objects on either side of trailer 20, whereby a driver may be informed of the detection of such objects. Transducers 42a–42j and 42a'–42j' may be activated, for example, automatically by activation of the turn signals of tractor 15. In addition or alternatively, transducers 42a–42j and 42a'–42j' may be activated independently of the automatic mode of operation in conjunction with operation of the turn signals. As shown in upper plan view of FIG. 13, transducers 42a–42e and 42a'–42e' emit respective beams 242a–242e and 242a'–242e' to detect objects located within the respective beamwidths. Similar beams are emitted by transducers 42f–42j and 42f'–42j'. Specifically, control circuit 74 supplies transducer control signals for sequentially activating transducers 42a–42j and 42a'–42j'. For example, the rows of transducers 42f–42j and 42f'–42j' positioned along the lower edges of the side panels of trailer 20 may be operated by control circuit 74 beginning at the bottom rear of the trailer, continuing to the front of the trailer, and then returning to the first transducer in the series to repeat the process. The same sequence may be utilized for transducers 42a–42e and 42a'–42e' located at the upper edges of the side panels of trailer 20. If a wave is reflected back to the transducers, control circuit 74 determines that an object is present and can calculate the distance from the activated transducer to the detected object. If no wave is reflected back to the transducers, control circuit 74 determines that no object is present. In response to these determinations, control circuit 74 communicates information to the driver. Control circuit 74 may be configured to communicate information regarding detected objects and/or to communicate information indicating that a particular area is clear of any objects in the manner discussed above. It will be apparent that different numbers and configurations of transducers are capable of suitably detecting objects proximate to the side panels of trailer 20 and may be utilized without departing from the scope of the present invention.

Figure 14:
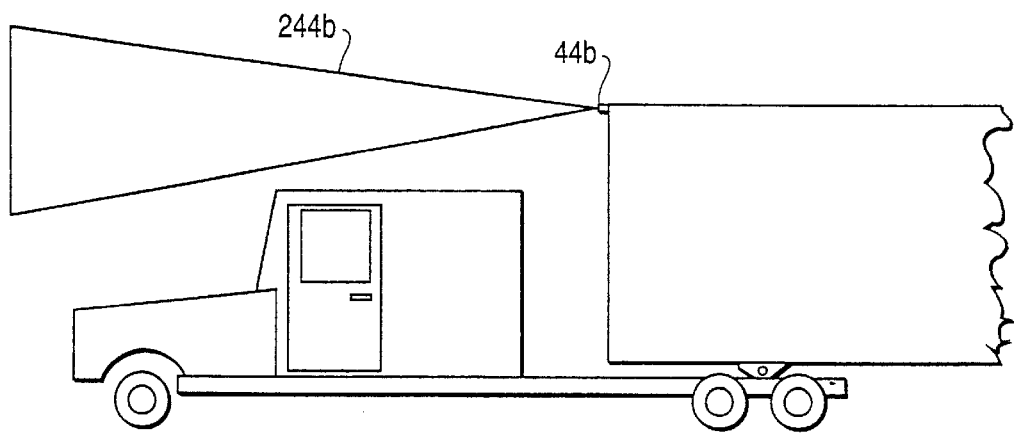
FIG. 14 illustrates the beams associated with transducers of the fourth transducer group.

The operation of fourth transducer group 60d will be explained with reference to FIG. 14. Fourth transducer group 60d is constituted by transducers 44a and 44b and is used to detect whether there is sufficient clearance for trailer 20 to pass under or through tunnels, bridges, tree limbs, viaducts, and the like, whereby a driver may be informed of the detection of such objects. As shown in FIG. 14, transducer 44b emits a beam 244b to detect objects located within the beamwidth. Transducer 44a similarly emits a beam (not shown). Fourth transducer group 60d thus forms a clearance detection system. Transducers 44a and 44b may, for example, be manually activated to check clearance from the top of the trailer to viaducts, tree limbs, and other objects under which trailer 20 must pass. Once activated, the system may run automatically until manually deactivated. If a wave is reflected back to transducers 44a or 44b, control circuit 74 determines that an object is present and can calculate the distance from the activated transducer to the detected object. If no wave is reflected back to the transducers, control circuit 74 determines that no object is present. In response to these determinations, control circuit 74 communicates information to the driver. Control circuit 74 may be configured to communicate information regarding detected objects and/or to communicate information indicating that a particular area is clear of any objects in the manner discussed above.

Figure 15:
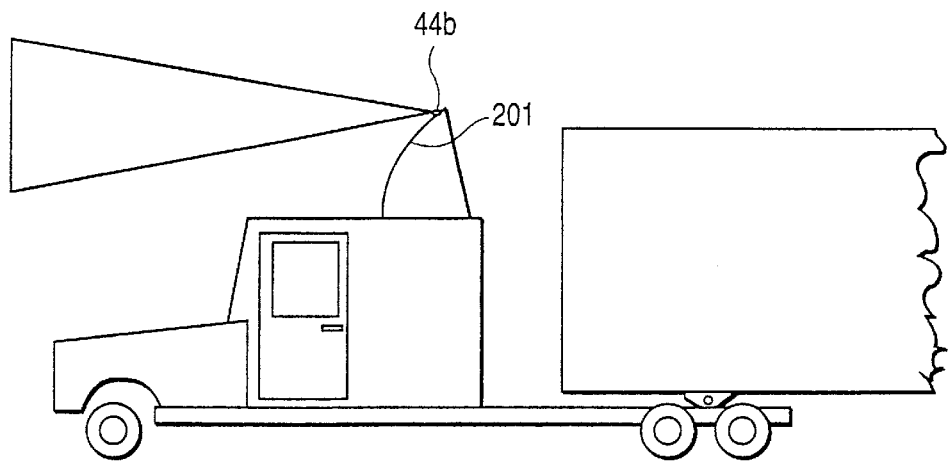
FIG. 15 illustrates the alternative positioning of transducers of the fourth transducer group.

With reference to FIG. 15, tractor 15 may include an airfoil 201 attached to the top of the cab. In this instance transducers 44a and 44b may be attached to airfoil 201. This arrangement is operable in the same manner as discussed above with respect to FIG. 14.

Figure 16:
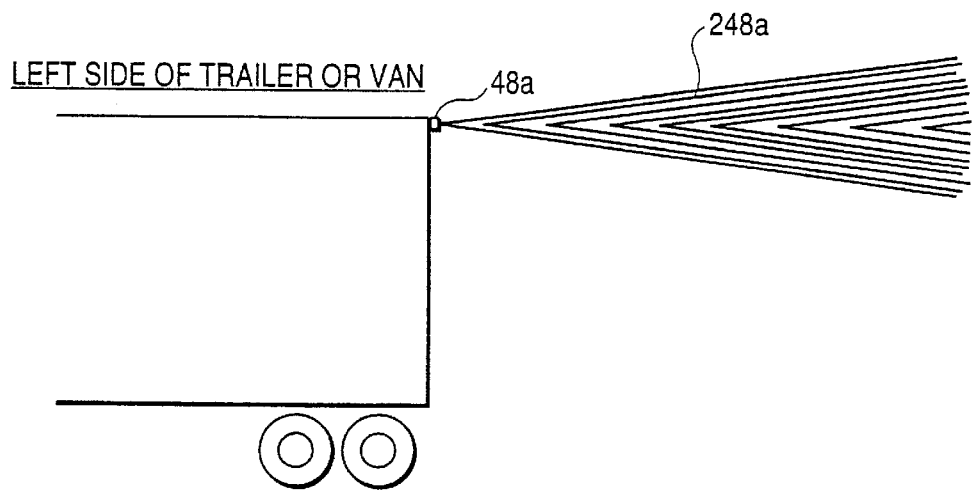
FIG. 16 illustrates the beams associated with transducers of the fifth transducer group.

The operation of the fifth transducer group 60e will be explained with reference to FIG. 16. Fifth transducer group 60e is constituted by transducers 48a and 48b and is used in detecting whether there is sufficient clearance for trailer 20 to pass under or through tunnels, bridges, tree limbs, viaducts, and the like, whereby a driver may be informed of the detection of such objects. As shown in FIG. 16, transducer 48a emits a beam 248a having different lengths to detect objects located within the beamwidth. Transducer 48b emits a similar beam (not shown). Fifth transducer group 60e thus forms a clearance detection system. Transducers 48a and 48b may, for example, be manually activated to check clearance from the top of the trailer to viaducts, tree limbs, and other objects under which trailer 20 must pass. Once activated, the system may run automatically until manually deactivated. The operation of transducers 48a and 48b is same as that for transducers 44a and 44b and reference should be made the discussion thereof. Transducers (not shown) may also be attached to the upper edge of the back of tractor 15 in order to detect objects approaching the tractor when a trailer is not attached thereto.

Figure 17:
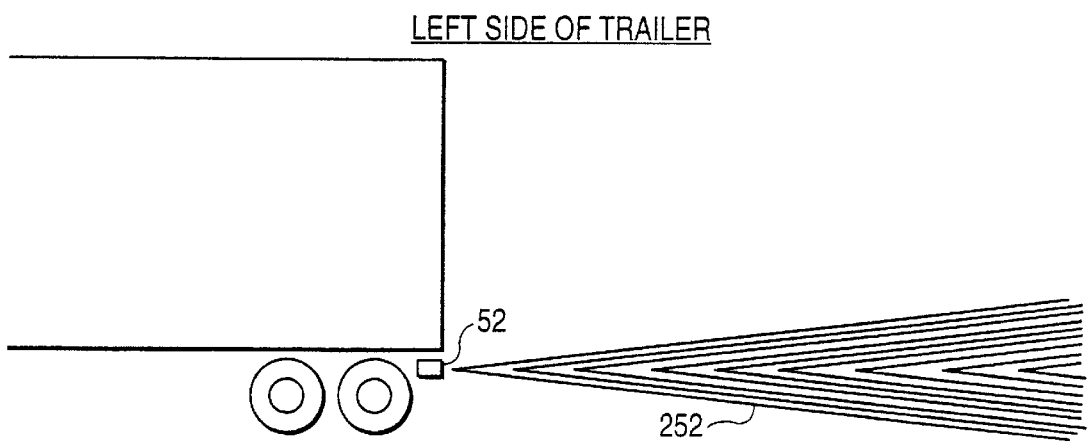
FIG. 17 illustrates the beams associated with transducers of the sixth transducer group.

The operation of sixth transducer group 60f will be explained with reference to FIG. 17. Sixth transducer group 60f is constituted by transducer 52 and is used in detecting objects directly behind trailer 20 which often may not be seen using mirrors 32 and 34. Transducer 52 may, for example, be manually activated at the driver's discretion and also automatically activated when the tractor-trailer is backing up. The system continues to operate until manually deactivated or until the tractor-trailer is taken out of reverse gear. As shown in FIG. 17, transducer 52 emits a beam 252 having different beamlengths which enables detection of objects. Control circuit 74 communicates information regarding any detecting object to the driver using a speaker and/or display 72 as discussed above. A transducer (not shown) may be similarly attached to tractor 15 for detecting objects when a trailer is not attached to tractor 15.

Figure 18A:
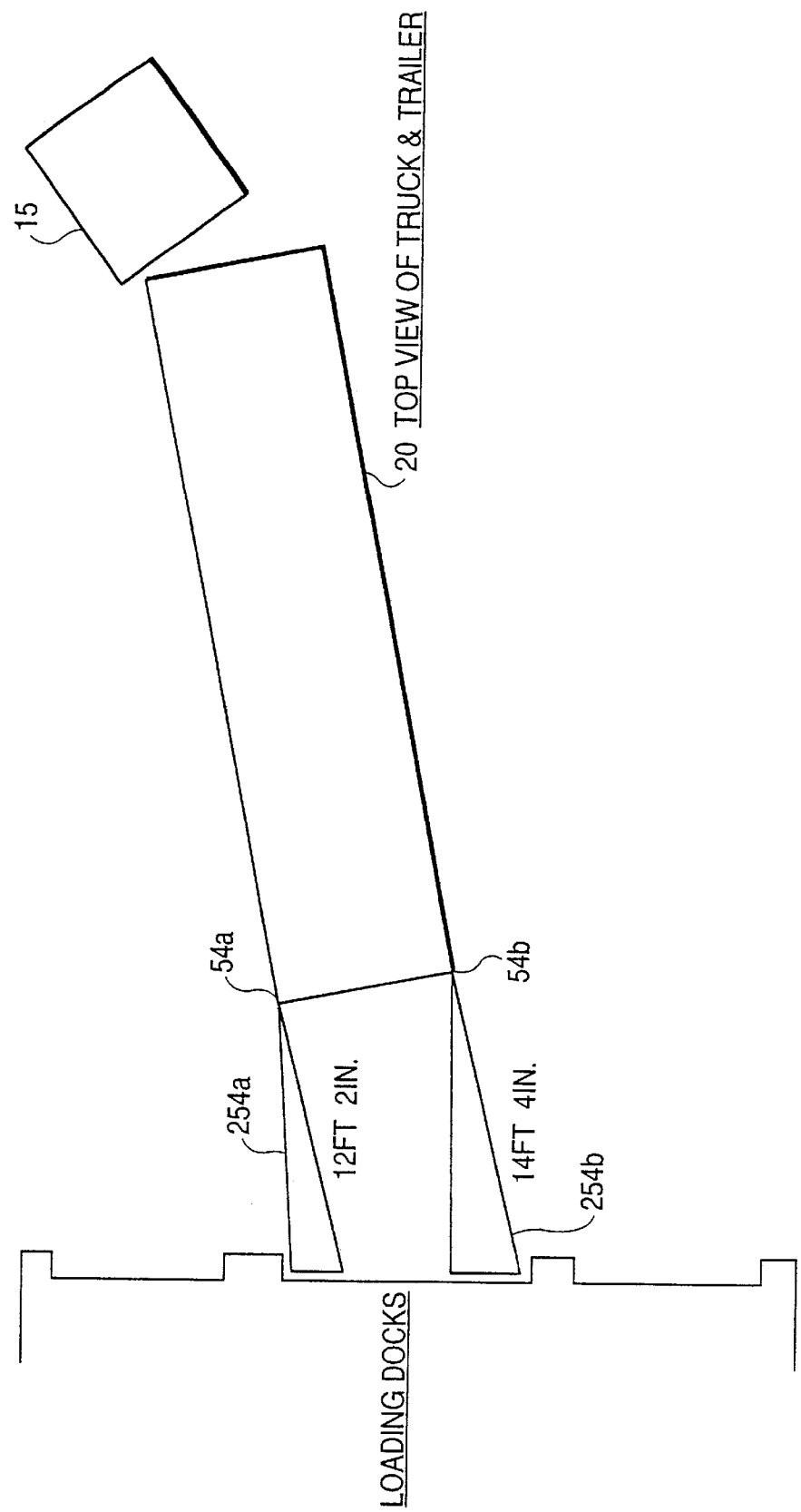
FIGS. 18A and 18B illustrate beams associated with transducers of the seventh transducer group.
Figure 18B:
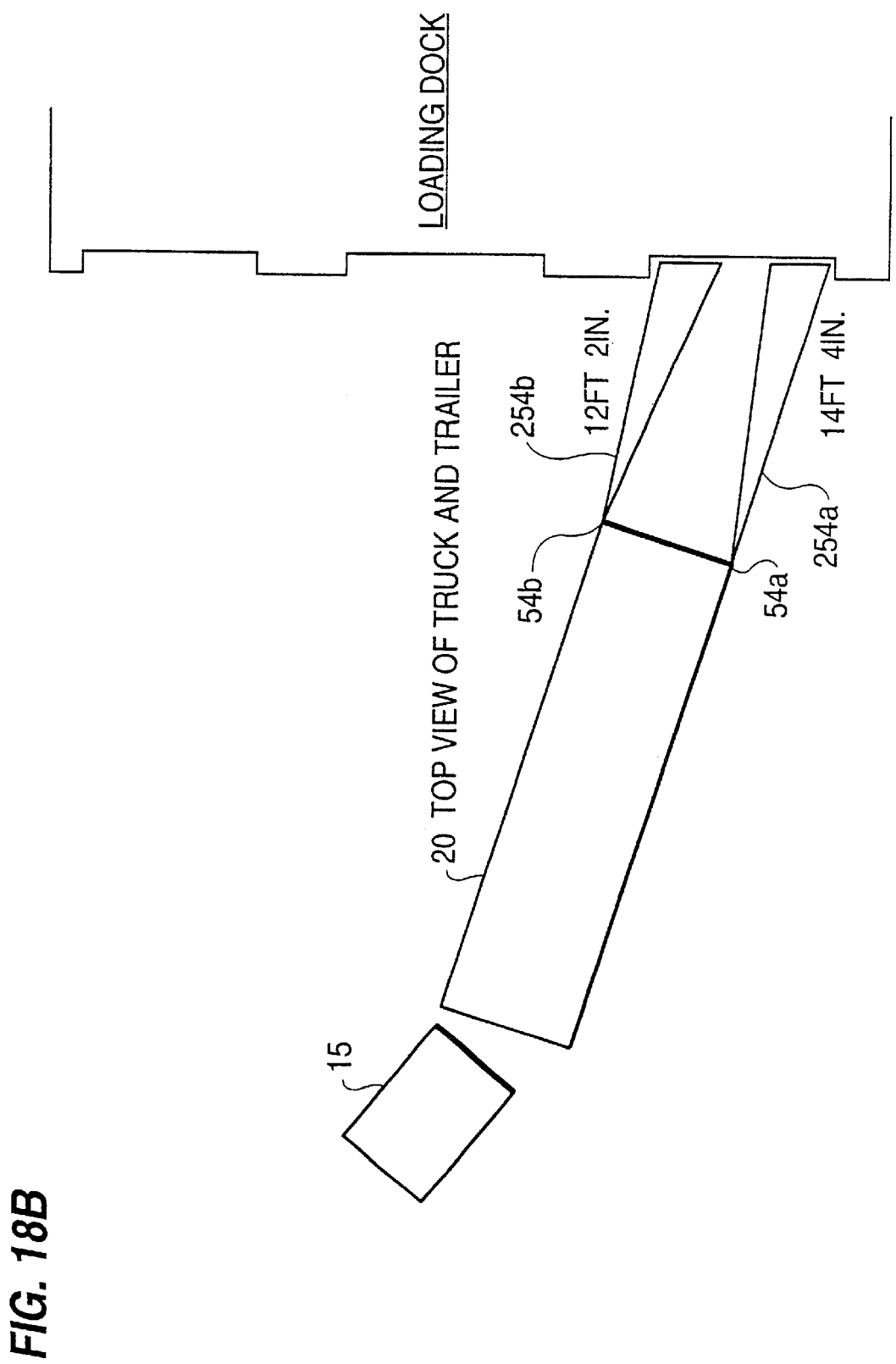
Figure 18C:
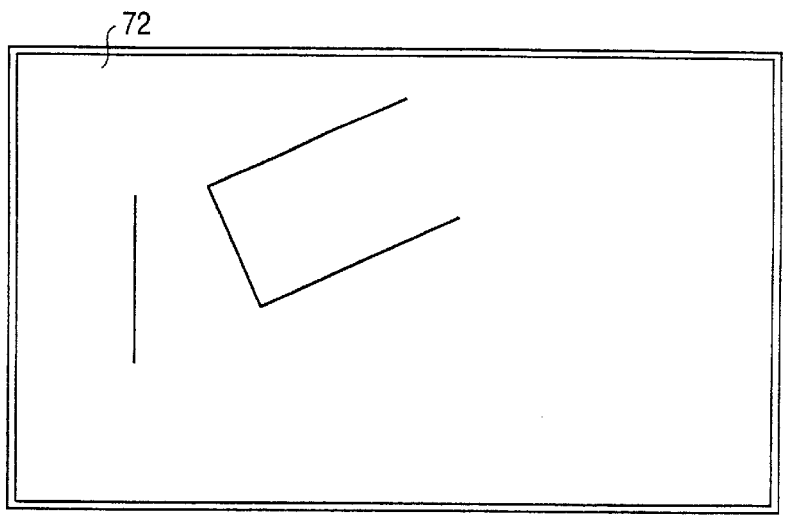
FIG. 18C illustrates a graphical representation for display on display 72.

The operation of seventh transducer group 60g will be explained with reference to FIGS. 18A–18C. Seventh transducer group 60g is constituted by transducers 54a and 54b and enable the driver to gauge the distance between trailer 20 and a dock or loading area for alignment purposes. This system may be, for example, activated manually. Once activated, the system automatically continuously checks alignment of the trailer to the dock or loading area until manually deactivated. As shown in FIGS. 18A and 18B, transducers 54a and 54b emit respective beams 254a and 254b which enable a determination of the corresponding distance from the dock. Control circuit 74 may generate display information for display 72 as in FIG. 18C indicating that the trailer is not aligned and that correction is required. Transducers (not shown) may also be similarly attached to tractor 15 to determine the alignment between tractor 15 and the loading dock when a trailer is not attached to tractor 15.

Figure 19:
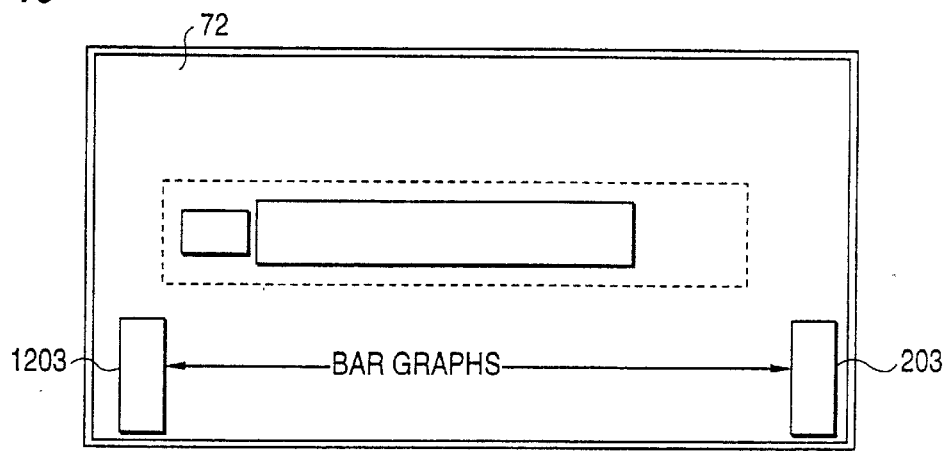
FIG. 19 illustrates an alternative graphical representation for display on display 72.

A second version of display 72 is shown in FIG. 19, wherein two bar graphs 203 are provided which indicate to the driver the position of the trailer relative to a loading dock or other proximate object. These two bargraphs 203 provide the driver with alignment information at a quick glance so that the driver need not rely on a number display to maneuver trailer 20.

Figure 20:
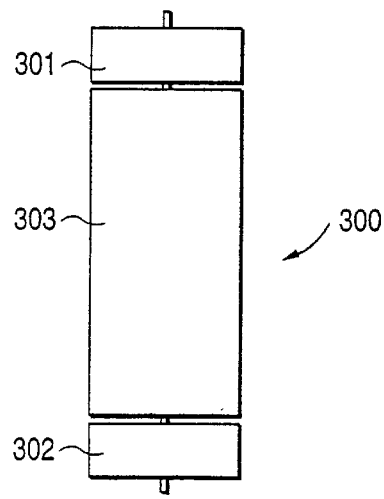
FIG. 20 illustrates a mirror in accordance with another embodiment of the instant invention.

FIG. 20 illustrates a modified mirror which may be utilized in accordance with the instant invention. Specifically, mirror 300 includes stationary mirror parts 301 and 302 and rotatable mirror part 303. In accordance with this aspect of the invention, a driver is provided with both a view obtained when mirror part 303 is rotated in accordance with an angle between the tractor and the trailer as well as a view from unrotated or fixed mirror parts 301 and 302.

It will be recognized that although a tractor-trailer containing all of the various transducer groups has been described above, the instant invention is in no way limited in this respect. Thus, a tractor-trailer may utilize any one or more of the various transducer groups described above within the scope of this invention. In addition, the use of these transducer groups is not limited to tractor-trailer combinations and is generally applicable to vehicles which may or may not have trailers attached thereto.

In addition, the above-described system may be modified to include a control unit including a microprocessor located in the trailer for controlling the transducers in the third, fourth, fifth, sixth, and seventh transducer groups. This trailer control unit would be responsive to signals from eontrol circuit 74 and would supply information regarding detected objects, for example, to control circuit 74. In another modification, the trailer control unit may contain a memory which includes information regarding the trailer such as the trailer length, width, etc. Upon connecting the trailer control unit to control circuit 74, this information may be "dumped" to memory 76 for use in an algorithm for determining the mirror angle based on the tractor-trailer angle. Alternatively, a mirror angle-to-trailer angle table appropriate for the trailer may be dumped to memory 76.

Although the above embodiments are described in terms of using ultrasonic waves, the invention is not limited in this respect and other waves of different frequencies may be used.

The United States patent and applications referenced above are hereby incorporated by reference into this application in their entirety.

Numerous characteristics and advantages of the invention have been described in detail in the foregoing description with reference to the accompanying drawings. However the disclosure is illustrative only and the invention is not limited to the precise illustrated embodiments. Various changes and modifications may be affected therein by one skilled in the art without departing from the scope and spirit of the invention.

We claim:

1. A system for automatically adjusting the angle of a rotatable side view mirror of a vehicle having a trailer coupled thereto, said system comprising:

at least one pair of transducers, each comprising a transmitter and a receiver, and attached to the rear of said vehicle and spaced apart from one another for transmitting signals having a predetermined beamwidth toward said trailer and for separately receiving signals reflected by said trailer;

said transducers and the opproximate center of the transmitted signal beamwidth being positioned at a selected angle so as to be non-parallel to the longitudinal center axis of the vehicle to transmit and receive the signals;

a control circuit operative to control said transducers to determine an angle between said vehicle and said trailer based on the signals transmitted and received by said transducers wherein said vehicle and said trailer may be angled relative to each other and an angle control signal generated in response thereto;

a drive unit responsive to the control signal for rotating said rotatable side view mirror based on the determined angle.

2. The system of claim 1, wherein said pair of transducers are positioned substantially non-parallel to each other for transmitting and receiving in at least two non-parallel directions.

3. The system of claim 1, further includes at least two additional pairs of angled transducers that are positioned substantially non-parall to each other for transmitting and receiving in at least four additional substantially non-parallel directions with respect to each other.

4. The system of claim 3, wherein one transducer of each of at least two pairs are substantially parallel to each other.

5. The system of claim 4, wherein the two additional pairs of transducers are positioned spaced from, but adjacent the longitudinal center axis.

6. The system of claim 5, wherein said one pair of transducers are positioned along the rear of the vehicle adjacent the sides of the vehicle.

7. The system of claim 1, further includes a rotatable light source, wherein said control circuit further generates a light source control signal for rotating said rotatable light source based on dimensional information and the determined angle.

8. The system of claim 1, further includes detecting means for detecting objects proximate to said vehicle and said trailer, said detecting means comprises other transducers attached to at least one of said vehicle and said trailer.

9. The system of claim 8, wherein said detecting means for detecting objects proximate to said vehicle further includes:

a control unit including a control circuit for controlling said detecting means; and communicating means for communicating to a driver of said vehicle information regarding objects detected by said detecting means.

10. The system of claim 9, wherein said communicating means comprises a visual display means for visually displaying said information to the driver.

11. The system of claim 9, wherein said detecting means comprises:

at least one transducer positioned on an upper portion of said vehicle for detecting approaching objects.

12. The system of claim 9, wherein said detecting means comprises at least one transducer attached to a rear portion of said trailer.

* * * * *